United States Patent [19]
Brumme et al.

[11] Patent Number: 6,134,559
[45] Date of Patent: Oct. 17, 2000

[54] UNIFORM OBJECT MODEL HAVING METHODS AND ADDITIONAL FEATURES FOR INTEGRATING OBJECTS DEFINED BY DIFFERENT FOREIGN OBJECT TYPE SYSTEMS INTO A SINGLE TYPE SYSTEM

[75] Inventors: Christopher Brumme, Mercer Island, Wash.; Michael De Groot, Cupertino, Calif.; Ralph Lemke, Sunnyvale, Calif.; Frank Dancs, Hillsborough, Calif.; Priscilla Fung, Union City, Calif.

[73] Assignee: Oracle Corporation, Redwood Shores, Calif.

[21] Appl. No.: 09/067,061

[22] Filed: Apr. 27, 1998

[51] Int. Cl.[7] .................................................. G06F 17/30
[52] U.S. Cl. ...................... 707/103; 709/103; 709/203; 709/318
[58] Field of Search ............................ 707/103; 709/103, 709/203, 318; 379/229

[56] References Cited

U.S. PATENT DOCUMENTS

| | | | |
|---|---|---|---|
| 5,799,313 | 8/1998 | Blackman et al. | 707/103 |
| 5,806,066 | 9/1998 | Golshani et al. | 707/100 |
| 5,937,409 | 8/1999 | Wetherbee | 707/103 |
| 5,953,720 | 9/1999 | Mithal et al. | 707/10 |
| 5,970,490 | 10/1999 | Morgenstern | 707/10 |

OTHER PUBLICATIONS

Nguyen, Cuong ("Toward Optimal Assignment of Human Functions in Complex Defense Systems via Uniform Object Modeling and Real–Time Simulation", IEEE, Jun. 1997, pp. 332–338).

*Primary Examiner*—Thomas G. Black
*Assistant Examiner*—William Trinh
*Attorney, Agent, or Firm*—Stattler Johansen & Adeli LLP

[57] ABSTRACT

A uniform object model integrates objects defined by foreign type systems into a single integrated object oriented system. The type system for the integrated object oriented system supports a superset of features from foreign object systems. The uniform object model approach converts foreign objects into uniform object model objects defined by the integrated type system and layers onto the uniform object model objects additional members supported by the integrated type system. Adapters integrate foreign objects and data sources into the integrated object oriented system by implementing foreign objects as full fledged objects of the system. The foreign object adapters are bi-directional such that objects, registered in the system, are exposed to foreign object systems. During run time, clients obtain a connection to the data source adapter, which supports the target data source, to execute transactions in the target data source. When executing transactions in the target data source, the data source adapter operates as an object access mechanism by generating an object populated with data from the target data source. The data source adapters support a single predetermined dialect of a query language, regardless of the target data source, and generate a query statement compatible with the target data source. The data source adapters also support persistence of objects in the data sources.

24 Claims, 16 Drawing Sheets

Order Entry State Model

UNIFORM OBJECT MODEL HAVING METHODS AND ADDITIONAL FEATURES FOR INTEGRATING OBJECTS DEFINED BY DIFFERENT FOREIGN OBJECT TYPE SYSTEMS INTO A SINGLE TYPE SYSTEM

BACKGROUND OF THE INVENTION

1. Field of the Invention

The present invention is directed toward the field of object oriented development environments, and more particularly to integrating foreign objects and different data sources into a single integrated object oriented environment.

2. Art Background

An object oriented approach to programming provides many advantages over traditional procedural programming approaches. For example, an object oriented approach permits code reuse through inheritance and modularity through encapsulation. There are many views as to what concepts define object oriented programming, and there are many terms and definitions for defining these concepts. In general, objects incorporate procedures, also called methods or operations, and data, also called attributes or properties. Objects are instantiated from and described by structures known as classes or types. For purposes of nomenclature, the object oriented programming environment described herein defines classes as types. A type is a general abstract specification, and an object instantiated from a type is a specific concrete instance of the type.

A type consists of an interface and an implementation. The interface comprises variables and function declarations, wherein the variables represent the attributes of the type, and the function declarations specify methods for manipulating those attributes as well as performing other operations. The declaration specifies the name, return type, and argument, known collectively as the signature. The implementation refers to the actual code that implements the methods specified in the interface. Types may consist of abstract types or implementation types. Objects are not instantiated from abstract types. Instead, objects are instantiated from an implementation type.

Object oriented languages, such as the C++ language, permit the creation of special types via inheritance. In general, inheritance is a mechanism for passing attributes and methods from a parent or base type to one or more child or derived types. Inheritance permits code reuse because interfaces and implementations need not be duplicated in the child type. Instead, the interfaces and implementations may be incorporated in any child type through reference of the parent or base type.

In general, objects communicate through message passing mechanisms. An object, known as a client object, may call a method of another object. A client object invokes a method of another object by accessing the object via the defined interfaces. Thus, to invoke a method in an object or to query an object, the client object requires knowledge of the signatures of the methods in the interface of the target object. The client object calls the methods and passes the appropriate parameters. For example, to obtain the value of an attribute in an object, a client object calls a method, via an interface, to obtain the value.

The concept of isolating the implementation of the methods and attributes within an object is known as encapsulation. Encapsulation is a powerful feature of object oriented systems because it separates the external part of an object (e.g. the part exposed to the objects user) from the internal part (e.g. the structure and implementation). Therefore, encapsulation permits changing the object implementation without affecting the interaction with other functions or objects as long as the interface does not change.

Just as there are many different concepts that define object oriented programming, there are also many different and diverse object oriented systems. Typically, the different object oriented systems are not compatible. However, integration of different object systems permits utilization of resources from several systems. For example, it is desirable to utilize, within a single integrated environment, object types and backend data sources from different systems. To accomplish this, conversion from one system to another is required.

One example of how systems differ is in methods of code reuse. For systems that implement inheritance, interfaces and implementations are incorporated by reference into derived types from parent or base types. The component object model (COM), defined as part of Microsoft's object linking and embedding (OLE) technology, does not use inheritance to make interfaces available to other objects. Instead, the COM specification defines use of containment and aggregation. In containment and aggregation, one object is part of another object. With containment, one object logically contains another object such that the outside or containing object creates the inside contained object without making any interface of the contained object directly available to client objects. In aggregation, the outside "aggregator" object exposes some or all of the inside "aggregatee" objects interfaces to the client object. As illustrated in the above example, different object oriented systems use different techniques for code reuse (e.g. inheritance, containment, and aggregation). Consequently, to successfully integrate different object oriented systems such as C++ and COM, the target system must be able to effectively handle the different abstract specifications of the different object oriented systems.

To solve the problem of different abstract specifications for different systems, systems, known as object middleware, utilize a cross product conversion approach. For this cross product approach, the object middleware converts directly from one system to another. For example, for an environment that attempts to integrate four systems, twelve conversions, three for each system, are required to completely integrate all four systems. If an additional system is introduced in the environment, eight more conversions are required to integrate the single additional system. As illustrated by this example, the cross product solution becomes exponentially more complex and difficult to implement as more object oriented systems are integrated into a single environment. Consequently, it is desirable to integrate different object oriented systems into a single system without providing a conversion mechanism between each pair of systems being integrated.

The least common denominator approach is another prior art technique used to implement object middleware. Using the least common denominator approach, the object middleware implements only the features common to all systems being integrated. For example, to integrate OLE objects and common object request broker architecture (CORBA) objects with a relational database as a backend data source, only those features supported by both CORBA and OLE can be used to access the relational database. Although the least common denominator approach provides a more straightforward implementation than the cross product approach, it does so at the expense of sacrificing functionality. Consequently, it is desirable to provide an integrated object oriented environment that does not require a conversion between each foreign object or data source system and that does not result in a subset of features through use of the least common denominator approach.

Object oriented systems utilize databases. For example, an object oriented software system uses databases to store instances of objects so that the objects "persist" in the database. Typically, the different data sources are not directly compatible in that each data source has specific requirements for executing transactions. Thus, an object oriented system must specifically interface with every different data source used in the system. Furthermore, in an object oriented system that integrates several different object systems (e.g. an object oriented system that implements foreign objects), each object system must conduct transactions specifically for the target data source.

One type of database used in software systems is a relational database. In general, a relational database stores information in the form of tables. Typically, relational databases include software that permit a user, through a query language, to visualize different portions and combinations of these tables. Object oriented software systems, which include encapsulated data and methods, do not have a direct counterpart with the relational model. For example, an object may include several attributes, specified by the class type, that define the state of the object at a particular time. To store the attributes of an object, an object oriented concept, in a relational database, a mapping of the attributes of the object to columns and rows in one or more tables is required.

Some prior art systems contain interfaces to generically access a data source, such as a relational database. For example, the Open Database Connectivity (ODBC) specification sets forth a standard interface to access databases. These standard interfaces provide uniform access to a database so that the object oriented system is not required to retain knowledge of the particular aspects necessary to perform transactions in every data source used in the system. Although such a standard interface simplifies access to data sources, the standard interfaces still require the data source client, such as an applications program operating in the object oriented system, to have a notion of the relational model (e.g. tables, columns and rows). For example, the standard interface may provide a standard access that obtains a particular row in a relational table. However, the client in the object oriented system must utilize the relational database in terms of columns and rows. Consequently, this prior art interface is a data access mechanism to integrate data from data sources into an object oriented system for manipulation.

Clients of a database issue querys statements, to extract information from the database. Query languages, such as the standard query language (SQL), are supported by databases to execute querys. However, SQL includes a number of dialects. Furthermore, some databases support some features specified in a query while others do not. As discussed above, a system may have multiple databases and utilize a standard interface, such as the ODBC interface, to access the databases. In such prior art systems, a client of a database is required to construct a SQL statement appropriate for the target database. Therefore, if there are multiple databases, then a single client user must maintain details on the particular dialect of the query language supported for that database. Thus, it is desirable to integrate data sources into an object oriented system without requiring the clients of the data sources to retain specific knowledge to execute transactions in one or more data sources.

SUMMARY OF THE INVENTION

A uniform object model integrates objects defined by different or foreign type systems into a single integrated object oriented system. The type system for the integrated object oriented system supports a superset of features from foreign object systems defined by foreign type systems. The uniform object model approach converts foreign objects into uniform object model objects defined by the integrated type system without loss of features provided by the foreign objects. The integrated object oriented system layers onto the uniform object model objects additional members supported by the integrated type system, although the members may not be supported by the foreign object systems. In one embodiment, the additional members include roles, states models, associations, rules, containers, and events.

The object oriented environment includes adapters to integrate foreign objects and data sources into the environment. To integrate a foreign object, a foreign object adapter, configured to support one or more foreign object systems, implements the functions supported by the foreign object system so that clients of the object oriented environment may view and use the foreign objects as if the foreign objects were full fledged objects originating in the object oriented environment. During run time, when a client accesses an object, such as through a method call, the foreign object adapter directly receives the method call to operate as a surrogate object for the foreign object.

The foreign object adapter, to implement foreign objects as full fledged objects in the object oriented environment, implements the additional features supported by the type system of the object oriented environment. For example, the foreign object adapter enforces rules, declared through the type system, against foreign objects being implemented. The foreign object adapter also triggers events, upon occurrence of a predetermined condition in the foreign object being implemented, and checks associations among one or more objects.

The foreign object adapters convert a class type from the foreign object system to a class type compatible with the object oriented environment. The foreign class types are registered with the object oriented environment. To permit full use and manipulation of foreign objects by clients of the object oriented environment, the foreign object adapters generate meta data, at both the abstract type and instance levels, to describe the foreign class types registered with the object oriented environment. The meta data permits clients to browse types. Also, through use of the meta data, foreign object adapters generate instances of foreign object types. The foreign object adapters are bi-directional such that class types, registered in the object oriented environment, are converted to class types defined in accordance with the type systems of foreign object systems.

To integrate data sources, a data source adapter, configured to support one or more data sources, connects clients of the object oriented environment to data sources. Prior to run time, components of a data source are mapped into the object oriented environment class types. In one embodiment, meta data is stored to describe each class type registered with the object oriented environment. During run time, clients obtain a connection to a data source adapter, that supports the target data source, to execute transactions in the target data source. In response to a request to execute a transaction in a target data source, the data source adapter generates an object populated with data from the target data source and defined in accordance with the class type specified by the client. Thus, data source adapters are object access mechanisms that instantiate objects from data sources for clients of the object oriented environment.

In one embodiment, the data source adapters execute client requests for data by browsing the meta data to determine the class type specified by the client, by creating an instance of the class type, and by populating the instance of the class type with data from the data source. For example, if the data source is a relational data source, then a relational adapter maps columns of a relational table to members of a class type in accordance with the predetermined mapping.

In one embodiment, data source adapters support querys. For this embodiment, a query statement, regardless of the target data source, is expressed in a single predetermined dialect of a query language. In operation, the data source adapter receives, from a client of the object oriented environment, a query statement for a target data source. In response, the data source adapter parses the query statement to extract information about the query, and generates a second query statement compatible with the target data source. Thus, a client is not required to maintain multiple query dialects to execute query statements against data sources that support different query language dialects.

The data source adapters also support persistence of objects in the data sources. The data source adapters receive requests from clients to store objects in data sources, and in response, generate, for a logical repository, tokens. Each token identifies the object in the logical repository without requiring the client to identify either the adapter that supports the data source or the adapter that implemented the instance of the object.

DETAILED DESCRIPTION OF THE PREFERRED EMBODIMENTS

Figure 1:
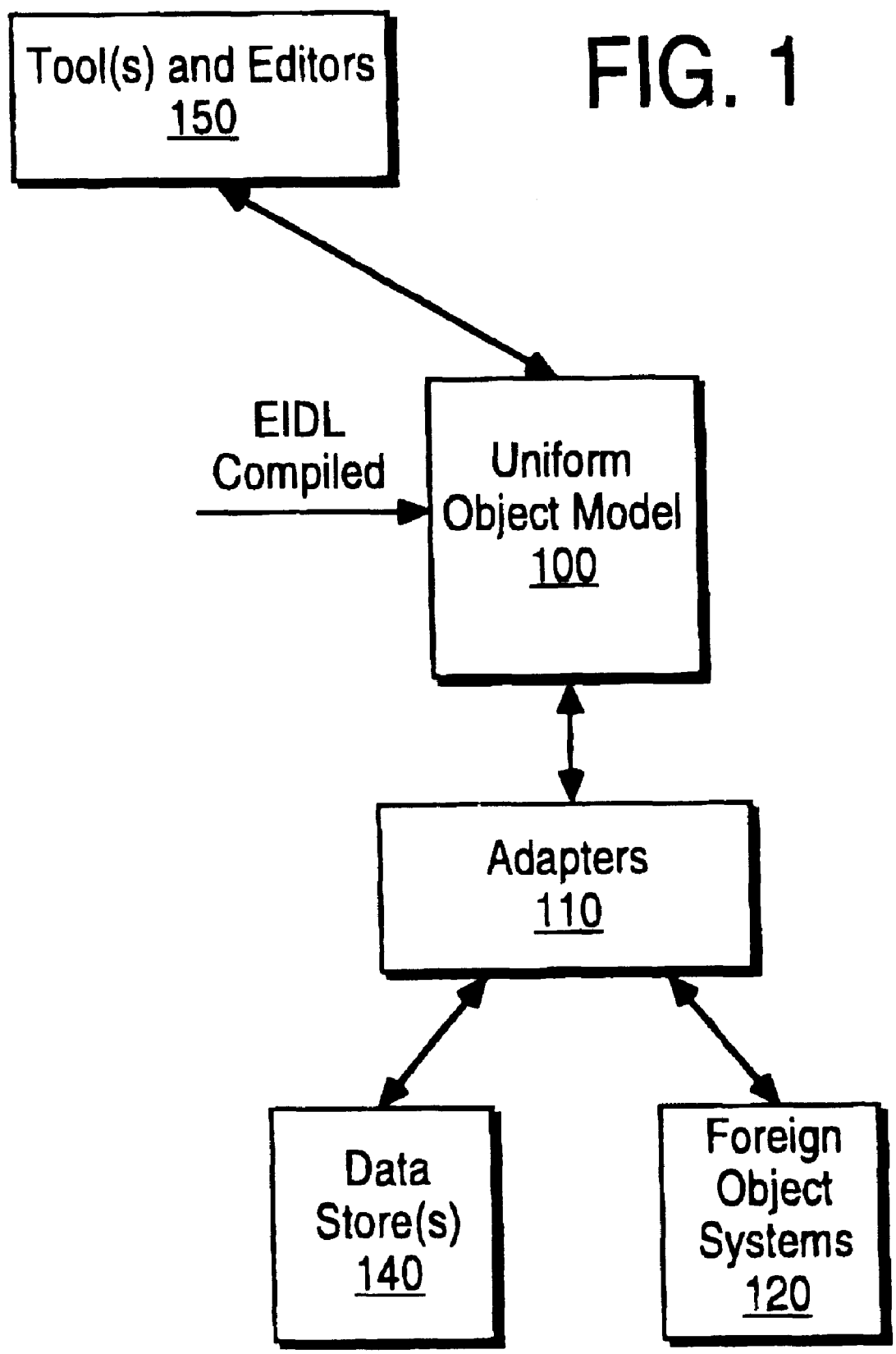
FIG. 1 is a block diagram illustrating the integrated object oriented system environment of the present invention.

Uniform Object Model Overview:

The uniform object model of the present invention implements an abstract specification in accordance with a uniform type system. As is explained more fully below, the type system is semantically rich, and it provides a framework to describe the structure and behavior of objects, including objects from foreign object systems and data from different data sources. The semantically rich type system supports a superset of object features. The superset type system thus permits integration with different foreign object systems and different backend data sources without reducing the capability of any of the backend data sources or reducing the features of any foreign objects. Consequently, the less desirable least common denominator and cross product approaches to cross platform integration are not required with the uniform object model of the present invention.

In general, the type system defines, for the uniform object model 100, a minimal configuration for run time operation of objects. The type system specifies only a minimal configuration for objects, and it is extensible. The extensible nature of the type system permits integrating features of foreign object systems not initially anticipated. In this way, if object features in a foreign object system are later added, the abstract specification for the type system permits implementation of the added features in the integrated object oriented environment. In one embodiment, which is described in conjunction with FIG. 3, the type system supports integrating a relational database, an object oriented database, and an open database connectivity (ODBC) standard as backend data sources. The type system further supports, by way of example, integrating foreign object system including CORBA objects, OLE objects, and COM objects.

In general, clients instantiate objects, registered with the type system, to build applications for run time operation. The uniform object model of the present invention provides a uniform view of objects to clients, regardless of the source of the object. In general, conversion mechanisms, known as adapters, adapt or dress foreign objects from different object systems to appear as objects derived from the uniform type system. In addition, data, stored in backend data sources, are augmented to include minimal characteristics that define an object in the uniform type system. Typically, a data source, such as a relational database, does not have a notion of an underlying type system. However, in the uniform object model of the present invention, conversion of data to an object in accordance with the type system, which may be instantiated for run time use, permits integration of any data source into the system.

In addition to foreign objects systems and data sources, objects may be compiled to generate an extended interface definition language (EDL) file that defines compiled classes from an object oriented language, such as C++ objects, in accordance with the underlying type system. Furthermore, object types, regardless of their source, may be edited through use of tools and editors. Therefore, regardless of the origin of the object (e.g. backend data source, foreign object system, compiled types, or edited types) the client in the integrated object oriented environment has a uniform view of all objects.

The uniform view of types in the object model of the present invention results in an opaque view of objects, such that clients need not be aware of the type system origin of the object to use the object. For example, the integrated object oriented environment may contain CORBA generated objects that are accessible to a client. The client may access and utilize the CORBA objects without any knowledge that the objects are CORBA objects because they appear as uniform type system objects. However, as is described more fully below, the source of an object is maintained by the system in order to maintain persistence of all objects.

FIG. 1 is a block diagram illustrating the integrated object oriented system environment of the present invention. The core of the object oriented system is the uniform object model, labeled 100 in FIG. 1. In general, the uniform object model 100 integrates foreign object systems, compiled classes or types, and data stores into a single integrated environment. Clients, such as application program developers, may access different objects and types in the uniform object model. Although objects may be derived from different sources, the objects appear to the client as being derived from a single type system.

The foreign objects systems, labels 120 on FIG. 1, and the data stores, labeled 140 on FIG. 1, are bidirectionally coupled to adapters 110. The adapters 110 convert foreign objects, which are configured in accordance with an underlying foreign type system, to operate in the uniform object model 100. Also, the adapters 110 dress or convert back-end data stores, such as relational databases and object oriented databases, to appear as active objects in the uniform object model 100.

Objects adapted into the uniform object model 100 appear as objects originating from a single type system, such that the origin or source of the object is transparent to clients operating in the integrated object oriented environment. The foreign object systems may include abstract classes or types from any type system. For example, foreign objects systems 120 may include objects complying with the common object bequest broker architecture (CORBA), Microsoft's object linking and embedding (OLE II) environment, or the common object model (COM). These foreign objects systems are merely exemplary, and as is described more fully below, the uniform object model of the present invention is extensible to permit integration of foreign objects systems not presently available.

The data store(s) 140 shown in FIG. 1 store data for the object oriented system, including providing a physical store for an object instance. The data store(s) 140 may comprise a relational database, such as an Oracle™ 7 database, an object oriented database, such as Oracle™ 8 database or a database that complies with the open database connectivity (ODBC) interface and data access object (DAO).

In addition to integrating foreign objects systems and data stores into a single integrated object oriented system, the system integrates objects that have been compiled through an extended interface definition language (EIDL) compiler. The EIDL compiled input may be derived from an object oriented language such as C++ or Visual Basic programming languages. Furthermore, objects may be manipulated and edited through use of any number of tools, labeled tools and editors 150 on FIG. 1. An example tool may include a property inspector, a form building tool, etc. As is described further below, the editors 150 permit editing of metadata from the uniform object model 100.

The adapters 110 permit bidirectional flow of objects and data to and from the uniform object model 100. For example, a foreign object, such as a CORBA object, may be instantiated from a CORBA abstract type registered with the uniform object model 100, and an instance of the CORBA object may persist in a relational database. For this example, once the CORBA object is registered with the uniform object model 100, it may be stored, via the system relational database adapter, because the object no longer requires a specific CORBA conversion for the relational database (e.g. the CORBA object becomes a uniform object model object).

In the integrated object oriented system of the present invention, the objects and their types are specified in a metamodel. In general, the metamodel captures and describes object structure and behavior for all accessible objects in the system. The adapters 110 describe types for each object through generation of system level metadata. In this way, for each foreign object type integrated into the system, system level metadata may be identified. Consequently, describing the type for each foreign object permits implementing features at the type system level. For example, through use of metadata for a corresponding type, the uniform type system of the present invention enforces rules and generates associations.

Figure 2:
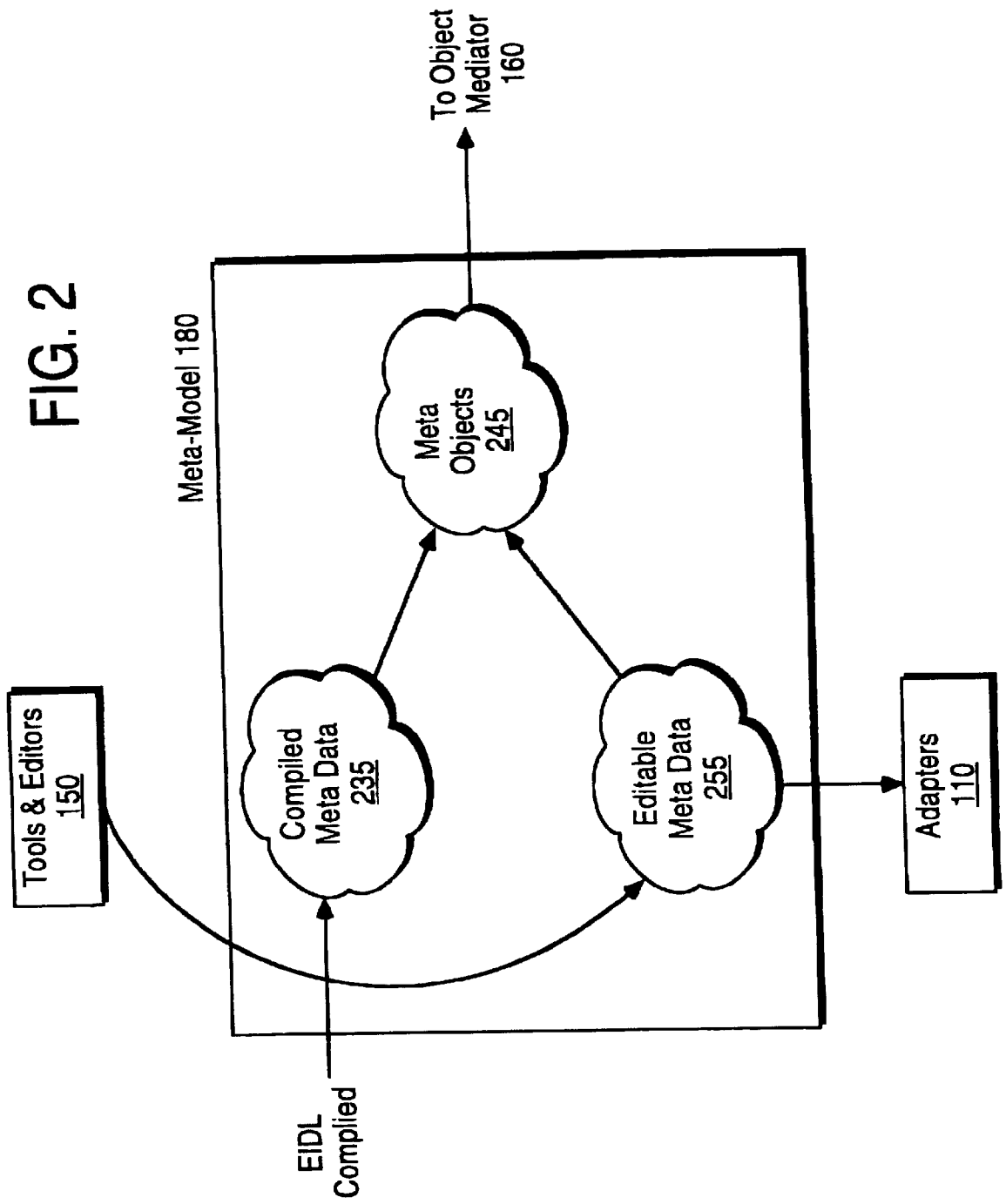
FIG. 2 conceptually illustrates one embodiment of a metamodel for use with the uniform object model of the present invention.

FIG. 2 conceptually illustrates one embodiment of a metamodel for use with the uniform object model of the present invention. As shown in FIG. 2, the metamodel 180 includes metadata 305 and metaobjects 245. The metadata 305 contains the information that describes objects and their types, that are registered with the system type registry. The metaobjects 245 expose the metadata 305 to the system. In the preferred embodiment, the metaobjects 245 expose metadata 305 to the object mediator 160. In one embodiment, the system augments Visual Edge™ metadata to define members specified by the uniform type system (i.e. Visual Edge™ metadata does not describe the semantically rich uniform type system). Visual Edge™ metaobjects are a standard class hierarchy of C++ objects.

The adapters 110 populate the type registry with metaobjects. Types must be registered with the type registry for object execution at run time. The underlying types described by the type system metadata originate from either the adapters 110, the editors and tools 150, or from the EIDL compiler. For the embodiment shown in FIG. 2, the metadata 305 includes compiled metadata 235 and editable metadata 255. The compiled metadata 235 is generated from the EIDL compiled (.EDL) files. In the preferred embodiment, the EDL files generate a C++ code initialization routine. The initialization routine instantiates the metaobjects into code. Specifically, each dynamic link library (DLL) and executable (.EXE) module has an associated initialization routine that instantiates the metadata for that routine.

As shown in FIG. 2, the tools and editors 150 access the editable metadata 255 to permit modeling and editing. Through editing, a client may enhance the structure and behavior of an object through support of the underlying semantically rich uniform type system. For example, a client may edit a COM object or a C++ class compiled object to add new attributes or roles. In addition, as is described more fully below, types may be edited to include rules to support a declarative style of application program development.

The metaobjects 245 access the compiled metadata 235 and the editable metadata 255 to expose all objects to the object mediator 160. The objects registered with the uniform type system have been "dressed" in accordance with the superset type system. Thus, the metamodel 180 supports the uniform view of all objects for operation in the integrated object oriented environment.

Figure 3:
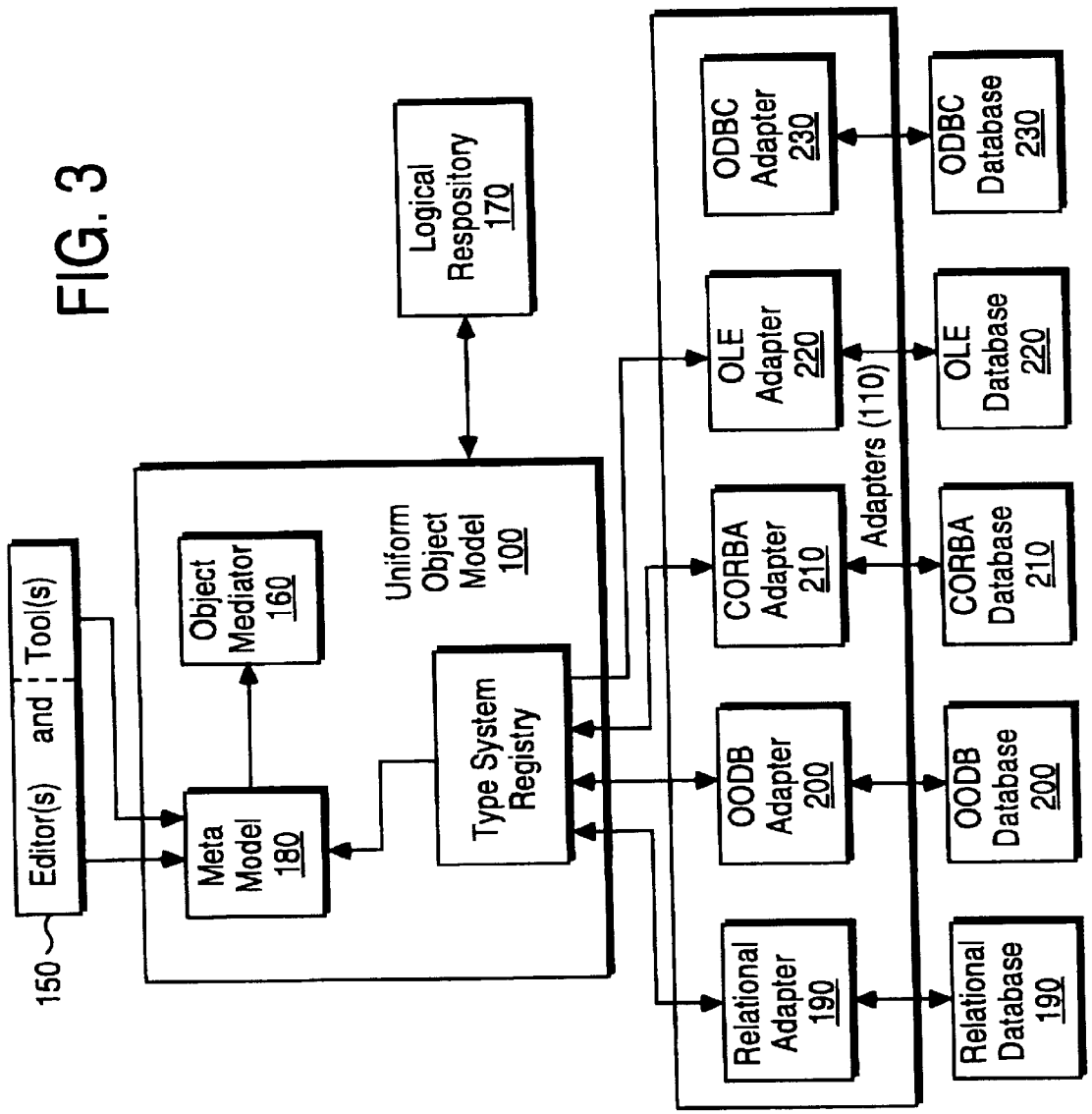
FIG. 3 is a block diagram illustrating one embodiment for an integrated object oriented environment.

FIG. 3 is a block diagram illustrating one embodiment for an integrated object oriented environment. The object oriented system includes the uniform object model 100 that comprises the metamodel 180 and object mediator 160. The object oriented system also includes editors and tools 150. For this embodiment, the adapters 110 include a relational database adapter 190, an object oriented database adapter 200, a CORBA adapter 210, an OLE adapter 220, and an ODBC adapter 230. The adapters 110 provide a window into the uniform object model 100. Specifically, the relational database adapter 190 interfaces the relational database 240 to the uniform object model 100; the OODB adapter 200 interfaces the OODB database 250 to the uniform object model 100; the CORBA adapter 210 interfaces CORBA objects 260 to the uniform object model 100; the OLE adapter 220 interfaces OLE objects 270 to the uniform object model 100; and the ODBC adapter 230 interfaces the ODBC connected database 280 to the uniform object model 100.

Adapters Overview:

The adapters 110 permit introduction of objects into the system for use at run time. The adapters 110 register foreign object types and data sources in the type system registry such that the back-end data sources and foreign object systems are dynamically available. Specifically, the adapters 110 describe objects and their associated types for each object through generation of metadata. In this way, metadata for each foreign object type and data integrated into the system may be identified.

As shown in FIGS. 1 and 3, foreign objects systems and data stores enter the uniform object model 100 via adapters 110. In general, an adapter makes instances of other objects, which originate from other type systems, and data, which may originate from any data store, full fledged uniform object model objects. To accomplish this task for foreign objects, an adapter maps the type system of the foreign object into the superset type system of the present invention. Mapping from one type system to another may be accomplished through well known commercial products, such as Object Bridge™, by Visual Edge Software, Ltd., St-Laurent Quebec, Canada.

The data store adapters implement system storage for instances of uniform object model objects. Data stores, such as relational and object oriented databases, do not have an underlying type system or object model. Therefore, the relational adapter 190, OODB adapter 200, and ODBC adapter 230 convert or "dress" the data store information into a uniform object model object. In addition to providing translation of back end sources into uniform object model objects, the adapters 110 support persistence of foreign objects, unique naming for identification and retrieval of objects, queries of objects in data stores, and transactions to different data stores. Therefore, the adapters 110 provide a one to one conversion between a data source and the uniform object model.

In a preferred embodiment, adapted object instances are built as dynamic link libraries (DLLs). Objects adapted into the uniform object model are dynamically loaded and registered with the object mediator 160. Specifically, all adapters in the adapters 110 register foreign objects in the type system registry. In this way, all meta data for all objects accessible in the uniform object model 100 are contained in the meta model 180.

Figure 4:
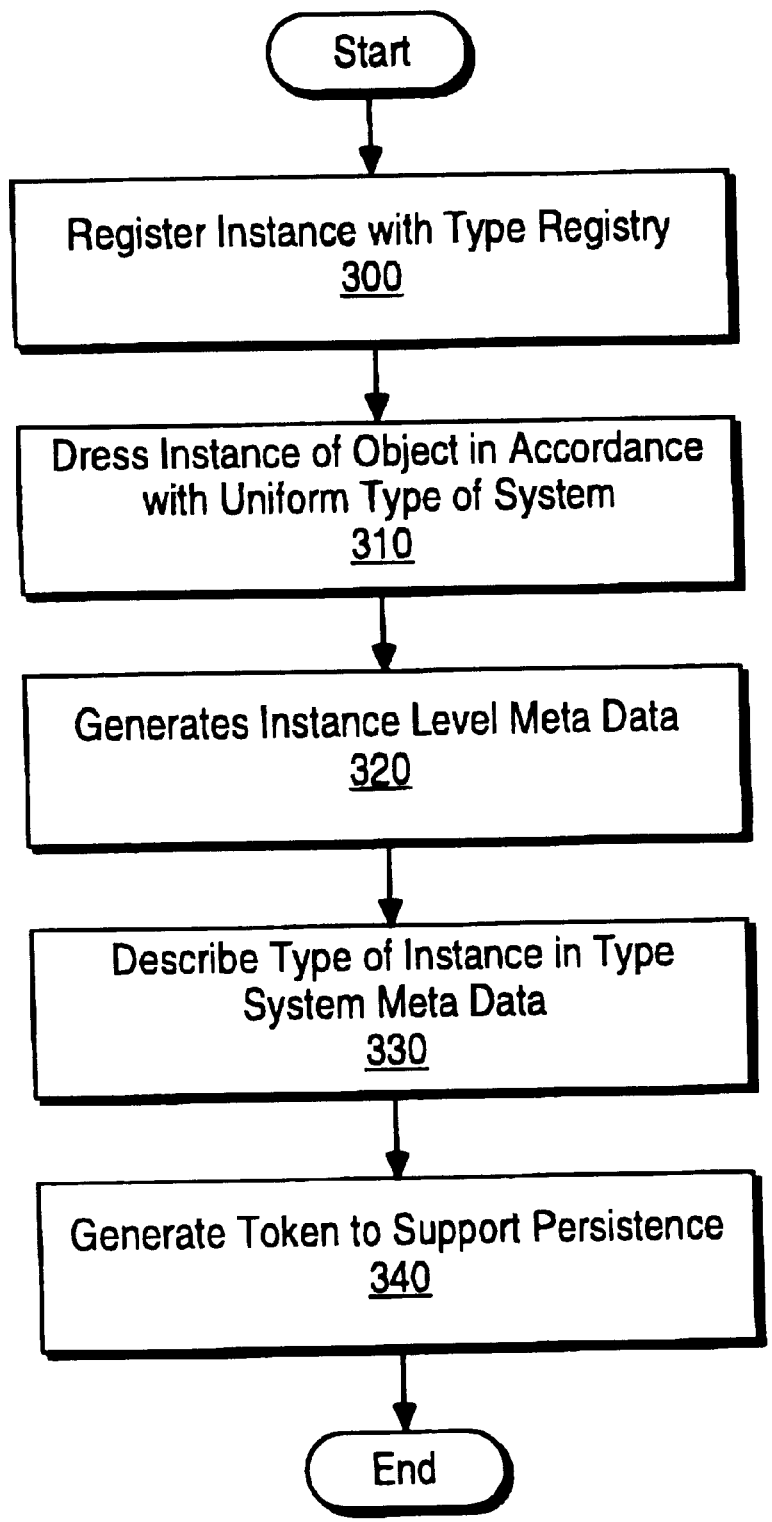
FIG. 4 is a flow diagram illustrating a high level operation for an adapter.

FIG. 4 is a flow diagram illustrating a high level operation for an adapter. As shown in block 300, the adapters 110 populate the type system registry with metadata to register objects with the uniform object model. In order to accomplish this, the adapters 110 disclose the capability of the foreign object or data store being adapted. For example, if a foreign object contains methods, attributes, and properties, then the registration into the uniform object model 100 reflects the characteristics and capabilities of the methods, attributes and properties of the foreign object. Thus, the capabilities of the foreign objects are preserved in the uniform object model, in the form of metadata, and the object mediator 160 exposes these capabilities to clients.

The adapters 110 also dress instances of foreign objects as uniform object model objects as shown in block 310 of FIG. 4. For example, the relational adapter 190 augments a row of a relational database to appear as a uniform object model object. Although the foreign objects are dressed to appear as uniform object model objects, the identity or source of a foreign object is preserved when exposed through the object mediator 160. For example, although an object exposed through the object mediator 160 is functionally a uniform object model object defined by the superset type system, the source of an object, such as a COM object, is preserved. The instance of an object is described to the integrated object oriented system 100 in instance level metadata. As shown in block 320 in FIG. 4, the adapters generate instance level metadata for a registered object, and the instance level meta data is stored as part of the integrated metamodel 180.

The adapters, in addition to exposing characteristics of the foreign objects, layer onto the foreign objects and data all of the capabilities of the superset type system. As a result, a client sees all the capabilities that a uniform object model object exhibits as well as the capabilities of the foreign object system or data source system. As shown in block 330 in FIG. 4, the adapter generates the type system metadata for storage in the metamodel 180. Note that at the client level the objects are abstractions derived from the back end foreign object or data source system. The client is not aware of the origin of the object. Instead, the client perceives all of the objects as uniform object model objects. Consequently, adapters 110 generate uniform object model objects for back end foreign object and data source systems that results in fully developed resources in the uniform object model 100.

The adapters 110 also support persistence of object instances. As shown in block 340 of FIG. 4, the adapters generate a token to identify that an instance of an object is persistent in the data store managed by the adapter. Although the adapters support persistence through generation of tokens, the persistence mechanism is implemented in the object model 100. One embodiment for implementing a persistence mechanism in the integrated object oriented system of the present invention is described more fully below.

The adapters 110 provide bidirectional access to and from back end data sources and foreign object systems. As discussed above, because the adapters 110 translate data and into full fledged uniform object model objects, a client of a foreign object system may utilize resources from other back end systems, as well as view objects originated in the uniform object model. For example, a client of CORBA may view a COM object, via the CORBA adapter, as if the object were a CORBA object. For this example, the CORBA adapter receives the COM object, which appears as a uniform object model type object in the metamodel 180, and it converts the uniform object model object into a CORBA compatible object.

Figure 5:
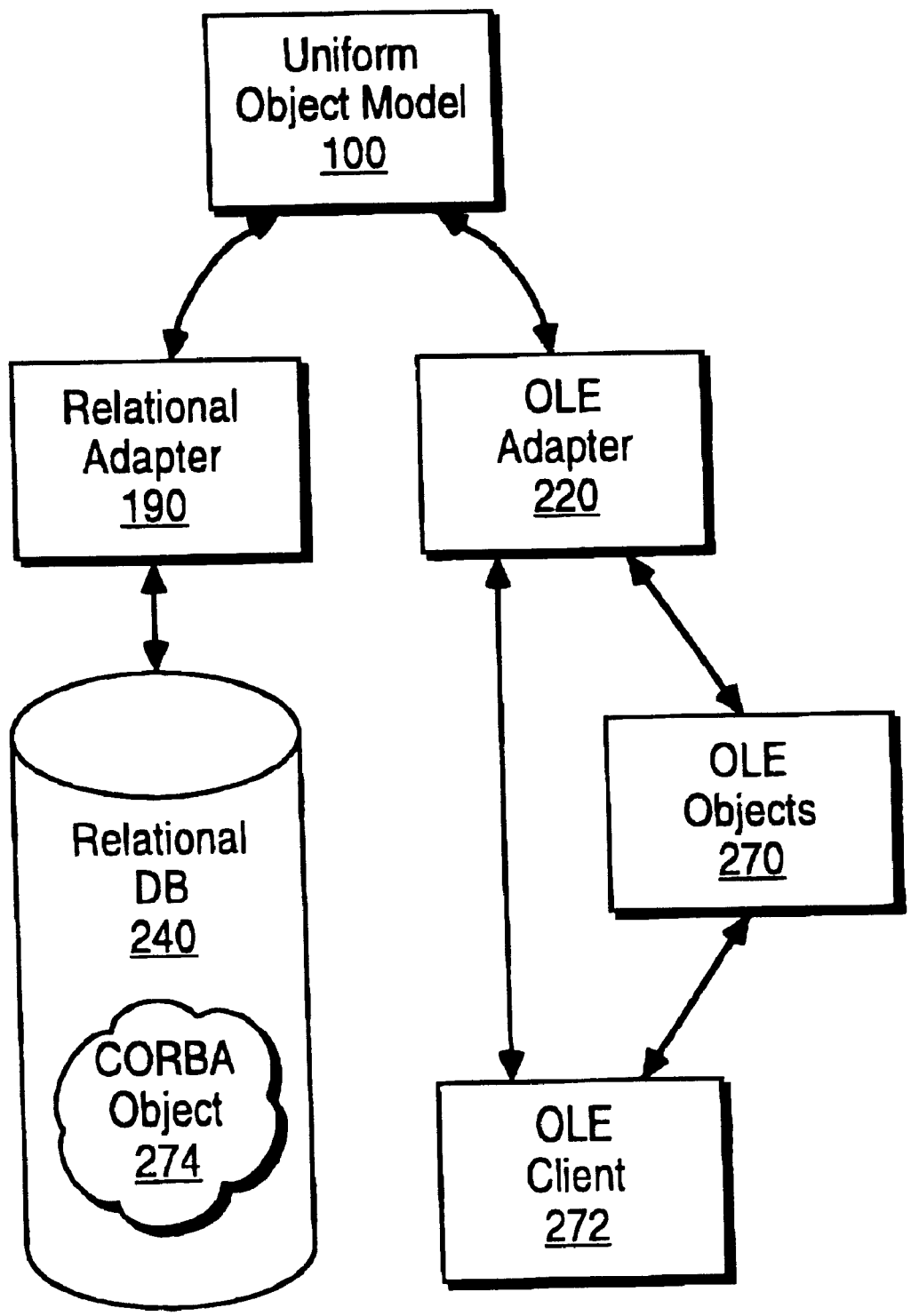
FIG. 5 illustrates an example of bidirectional access supported by the adapters.

FIG. 5 illustrates an example of bidirectional access supported by the adapters. For this example, an OLE client 272 accesses OLE objects 270. The OLE adapter 220 converts OLE objects, in accordance with the criteria discussed above, to uniform object model objects. This provides a first direction of conversion. For the example illustrated in FIG. 5, an instance of a CORBA object, labeled 274 on FIG. 5, is persistent in the relational database 240. The OLE client 272 may utilize the CORBA object 274. Through the persistence mechanism, the CORBA object 274 is retrieved from the relational database 240. The OLE adapter 220 may access the CORBA object 274 through use of the metamodel 180. As this point, the instance of the CORBA object 274 appears as a uniform object model object. In order for the OLE client 272 to "see" the CORBA object 274, the OLE adapter 220 converts the CORBA object 274, which is dressed as a uniform object model object, for exposure to the OLE client 272. The conversion from the uniform object model for exposure to a foreign object system provides the second direction of conversion to provide bidirectional conversion of data and foreign objects to and from the uniform object model 100.

A Superset Type System for A Uniform Object Model:

The object oriented system contains a semantically rich type system. The semantically rich type system provides a framework to describe the structure and behavior of objects, including objects from foreign object systems and data from different data sources. The type system supports a superset of object features. The superset type system thus permits integration with different foreign object systems and different backend data sources without reducing the capability of any of the backend data sources or reducing the features of any foreign objects.

In general, the type system defines a minimal configuration for run time operation of objects. Therefore, because the type system specifies only a minimal configuration for objects, it is extensible. The extensible nature of the type system permits supporting features of object systems not initially anticipated. For example, if object features are later added, the abstract specification of the underlying type system permits implementation of these additional object features.

The semantically rich type system facilitates application program development. Specifically, the type system of the present invention captures the intent of the application developer in an expressive way. As is described more fully below, an applications program developer declares intentions, through state models and rules, without coding these intentions directly into the application program. Therefore, the type system provides semantics on a system level that permits a programmer to express functionality of the application program through the semantics, and then the object oriented system enforces these semantics.

The type system of the present invention supports integration of three styles of application program development in an object oriented environment. In one approach, the type system supports the use of a declarative approach to application program development. For the declarative approach, a user specifies the functional operation of the application program. In one embodiment, the user specifies the functional operation of the application program through use of rules and state models. The declarations are enforced by the type system. Thus, the user is not required to write code to enforce the declarations.

The type system also supports a third generation languages (3GL) compiled approach to applications program development. For the 3GL compiled approach, the user develops classes, through use of programming languages such as C++ and Pascal, to implement the application program. The code is then compiled for run time operation. The 3GL compiled approach to application program develop provides a powerful tool for implementing a wide range of functionality for the program. In one embodiment, the 3GL compiled approach is developed through use of an extended interface definition language (EIDL). The EIDL permits a user to define types in accordance with the extended type system of the present invention. The EIDL code is then compiled, through use of an EIDL compiler, for run time operation in the object oriented environment.

The type system further supports applications development through use of fourth generation language (4GL) scripting. As will be appreciated by one skilled in the art, the integration of the declarative, the 3GL compiled and the 4GL scripting approaches provides the greatest flexibility and power to develop application programs. For example, a declarative approach to application program development provides a good way to add features or functionality that is not part of the original system. However, traditional declarative systems have limitations such that some objectives cannot be expressed in a declarative manner. Therefore, integrating the declarative, 3GL compiled and 4GL scripting approaches provides the application program developer the ability to select a style that most suits the particular needs for a given problem.

In one embodiment, the type system includes or supports roles, states models, associations, rules, containers, events, attributes, and methods. In general, an association is a relationship between two objects with a specified or implied action to be performed when one of the related objects is invoked. An association is indicated by the role members within each of the associated objects. A role is an expression that determines the behavior of an object. A role can either forbid actions or require actions. In general, a rule is a function declaration to control behavior of objects. As is described fully below, a rule is enforced on the system level, thereby eliminating the need for procedural code to enforce such actions. In one embodiment, the type system of the present invention builds on foundations provided by C++ objects and COM objects.

An attribute of an object is a member whose function is to record some piece of information about the corresponding object. An attribute represents a property of an object. An attribute has value and access rights, namely read only, write only, or read/write.

A method is a snippet of code associated with an object that performs an operation. For example, the purpose of a method may be to implement the behavior of an object. Typically, but not necessarily, the scope of a method is defined by the object's attributes. For example, executing a method may change the state of an attribute.

A container in the type system of the present invention is an object that holds other objects. The contained object inherits specified properties from the container object. The container object passes properties to other objects analogous to a type; however, unlike a type, a container object is not a factory or a prototype. The relationship between a container and a contained object is an association, and it is represented within each of the associated objects by a role member.

In general, roles permit dynamic addition or subtraction of attributes or characteristics. Typically, in object oriented technology, a type is defined to have state attributes. However, there may be characteristics that are orthogonal to these state attributes, but nevertheless relate to the class type. The use of roles in the type system of the present invention solves this object oriented technology problem, wherein characteristics, which are orthogonal to other state attributes for a type, are expressed.

Figure 6A:
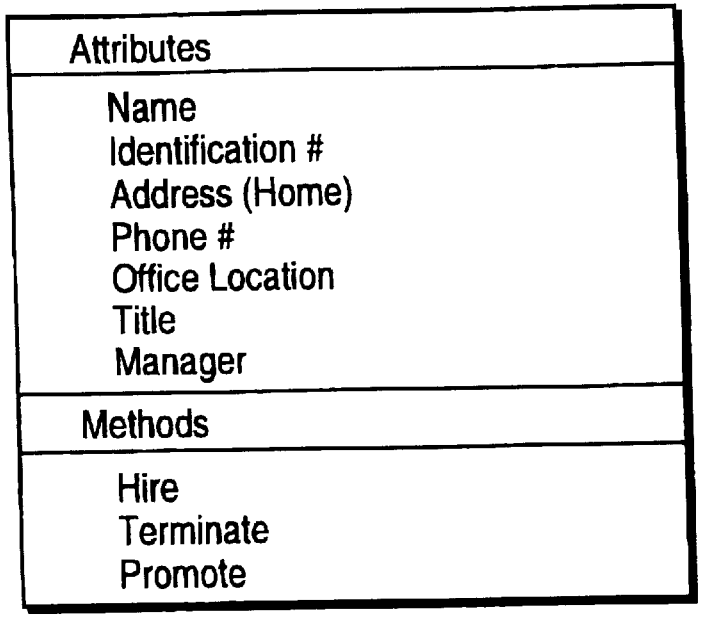
FIGS. 6a and 6b illustrate an example for using a role member to add an orthogonal characteristic to a type.
Figure 6B:
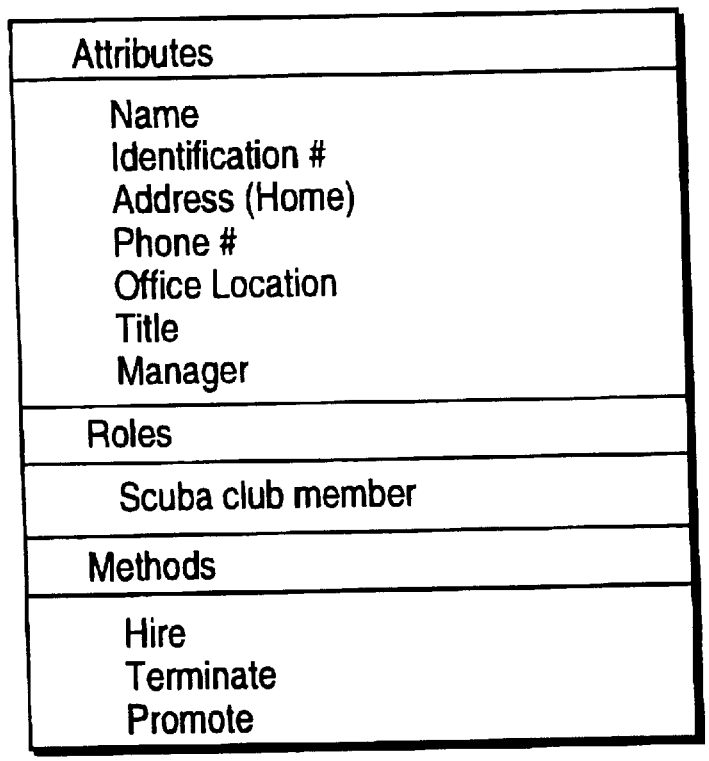

FIGS. 6a and 6b illustrate an example for using a role member to add an orthogonal characteristic to a type. As shown in FIG. 6a, an employee type includes a plurality of attributes. For the employee example, the attributes include a name, identification number, home address, telephone number, office location, title and manager. The employee type further includes a plurality of methods, namely a hire method, a terminate method, and a promote method. The attributes of the employee class type shown in FIG. 6a are attributes or characteristics common to all employees. Thus, objects may be instantiated from the employee class type with broad generality.

FIG. 6b illustrates a specialized employee class type. The specialized employee class type contains all the attributes and methods contained in the employee class type of FIG. 6a, and in addition, the specialized employee class type includes a role member entitled "scuba club member." The role member that specifies whether an employee is a member of the scuba club is orthogonal to the attributes of the employee class type. Since so few employees participate in the scuba club, defining an individual state attribute that relates to whether an employee is a member of the scuba club is not justifiable from a system performance perspective. Thus, for this specialized employee type, roles define the dynamic set of characteristics for the type.

Through use of roles, restrictions and interactions among objects with roles may be specified. For example, a person, as defined by a "person" object, may have many permissible characteristics expressed as role members, such as employment status. For this example, a user may specify, through use of role members, the "person" object be either an employee or a contractor, but not both. Furthermore, a user may place a restriction, through use of role members, that a single person can not be designated as a department within the company (i.e.,only two or more people constitute a department). As is explained more fully below, state models enforce restrictions on roles.

In general, associations describe relationships among objects as well as describe something about the nature of the relationship. For example, one object may contain another object. This relationship may be described in terms of associations. An association may refer to one or more objects. In one embodiment, an association role type is a specialization of an attribute metaobject. Based on this configuration, there are two different techniques for manipulating the underlying association. The underlying association may be configured through either the attribute member or the role member. An attribute, which serves as an association role, is either a collection of some sort (1:M) or a pointer to an interface. To access the attribute, a generic "get/set" attribute method is used. Furthermore, the generic "get/set xyz", where xyz is the name of a particular attribute, may be used. If the attribute is a collection, then the association is manipulated by either getting or setting the collection or by inserting, replacing or removing elements of that collection. The generic get/set attribute services are designed for browsers, like property inspectors or association traversal objects, that examine metadata to guide access. At the system metadata level, related types have first class objects for the attribute and role. However, at the instance level, there is not a first class object for an attribute.

The type system of the integrated object oriented environment permits the use of state models. The behavior of an object may be specified through one or more state models. Within an object, a condition, which is identified by an applications developer, controls the logical progression of the application. These conditions to control the progression of the application are called states. Each state is provided with a list of one or more valid predecessor and successor states. For example, a "sales order" object, developed for a sales order entry application program, may include state declarations that an instance of the object must pass through an "approved state" before reaching a "shipped state." In addition, the states are specified with conditions to be observed and events to be raised when a transition from one state to another is proposed.

In general, rules support the declarative style of application development. Specifically, rules permit an application developer to specify declarations about the function of the system, and the system enforces these declarations on the type system level. Rules, if they are linked to states, can be turned on and off. There are many triggers that may invoke enforcement of a rule. For example, triggers may include receiving an event, calling a method, entering or leaving a state, moving through a state transition, and changing and/or assessing an attribute of an object.

For each rule, a trigger invokes the rule, a condition determines a course of action, and an action implements or enforces the rule. An example rule may be triggered when a method is called. For this example rule, the condition may be based on the state of an attribute in the called method's object. Based on the condition (e.g., the state of the attribute), an action is executed such as returning an error or an exception. An action may also include changing the state for a state model. A complete description of the rules feature, including adding rules to objects as well as adding rules to foreign objects defined by foreign type systems, for enforcement on the type system level, is contained in U.S. patent application, Ser. No. 89/060,531, entitled "Methods and Apparatus for Declarative Programming Techniques in an Object Oriented Environment", inventors Michael DeGroot and Ralph Lemke, filed Apr. 15, 1998, which is expressly incorporated herein by reference.

For purposes of nomenclature, in the type system of the present invention, an event is a notification or an announcement from an object. Objects register or subscribe to events in order to receive the event notification upon occurrence of the specified event. Unlike an attribute, an event communicates to other objects that something has occurred. An event is not a method call, but methods may be invoked as a result of the occurrence of an event. A method call invokes a one to one relationship between the caller and the method. In contrast, with events, there is a one to many relationship between the object that raises the event and the objects that receive the event.

In certain circumstances, a single user action may precipitate the firing of a sequence of related events. While the object is in the process of firing this sequence of events, the object relinquishes the thread of execution to event handlers which, may in turn, attempt to set properties and call methods on the object that is the source object of the event. Because of this, an object may enter a special state that disallows some subset of normally permissible activities on the source object. Objects are required to handle reentrant situations, but they are not required to be arbitrarily functional when reentered. For example, while firing a request event, it may be illegal to call a method on the object which would itself fire the request event. The limitation to disallow certain functions is up to the object, but user written code may attempt implausible actions on the object.

As discussed above, an event is a notification or announcement made by an object. Like a method, an event has a signature that includes a name, parameter list, return value, and exception list. Information about a particular event is passed via the parameter specified in the event signature. The parameters may be simple values or complex structures. In one embodiment, source objects package information into a packet that represents information common to all events. Additional arguments may be passed as extra parameters. Event categories provide a convenient way to classify and organize events.

An object that raises an event is called a source object, and an object that receives an event is called a sink object. Thus, the source object generates the event, and the sink object is the recipient or subscriber for the particular event. A request event is utilized to ask permission from the sink objects. The sink objects can either grant permission or refuse. Events, known as "before" events, are fired before a specified action occurs. The "before" events provide sink objects an opportunity to prepare for the event. Events, known as "after" events, are fired after a specified action. The after events give sink objects an opportunity to respond to this action. The "before" and "after" events may not be canceled.

In addition to "before" and "after" events, "do" events are fired to provide sink objects an opportunity to supplement default behavior. The "do" event is called directly before the source object performs the action. The sink object returns a value that determines whether the source action should be done.

In general, objects respond to events by calling related methods. For example, an order object may respond to a "ship order" event by calling a "ship order" method. For purposes of nomenclature, the process of raising and responding to events is entitled "event propagation." Event propagation begins with a source object raising an event, and it ends with a method being called on the sink object. One or more sink objects register or subscribe to a source object's event. In addition, event signatures or categories may be dynamically added at run time. Sink objects may register interest in event signatures even if the source object does not currently export the event (e.g., in a programming environment, the source can raise events dynamically without prior notice of their existence). Consequently, events form a one to many relationship among the events source object, the type of event, and the event sink.

An event transformer is an object that is logically situated between a source object and a sink object. The purposes of an event transformer are to perform impedance matching between the source and sink objects and to perform calculation and event flow. In general, event propagation relies on the fact that the sink object implements the exact event signature. For example, if an event signature is specified with two parameters, then the source object passes two parameters and all of the sink objects are implemented with the two parameters. If the sink object does not implement the exact signature required by the source object, then an event transformer is required to provide matching of signatures. The event transformers then receive the event on behalf of the sink object, perform some rearrangement or calculation of the event information, and then redispatch the event to the sink object.

Figure 7:
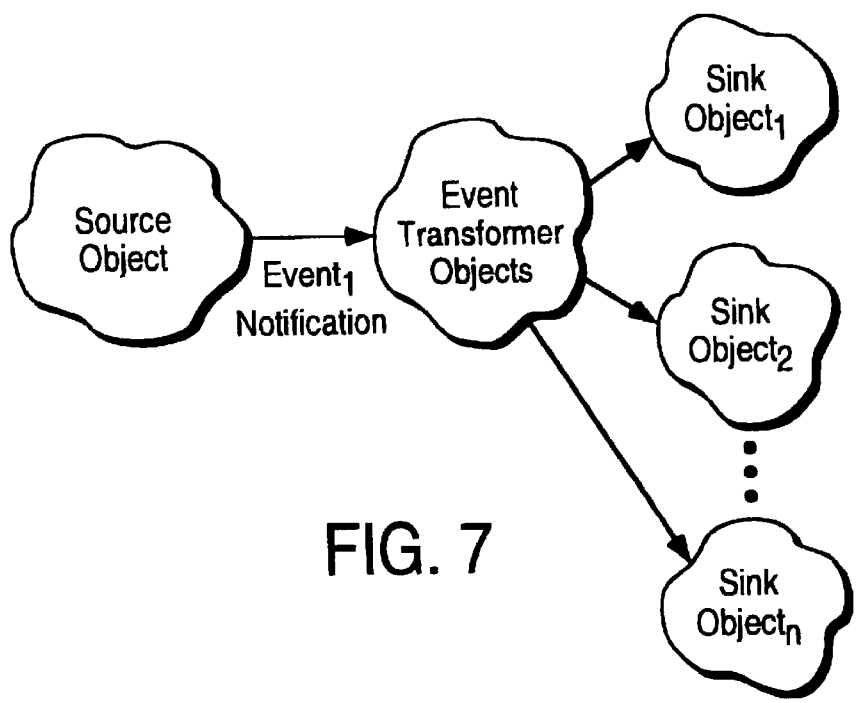
FIG. 7 illustrates an abstract representation of event propagation in the type system of the integrated object oriented system.

FIG. 7 illustrates an abstract representation of event propagation in the type system of the integrated object oriented system. A plurality of sink objects, labeled sink object$_1$, sink object$_2$, and sink objects$_n$, subscribe to an event, such as event$_1$. The source object, upon occurrence of the specified trigger, generates the event$_1$ notification for the event transformer objects. In turn, the event transformer objects relays the events to the sink objects.

Modeling Approach To Applications Program Development:

As discussed above, objects may have explicitly defined states, and for each state, one or more legitimate predecessor and successor states are specified. Furthermore, the objects, through use of events, specify actions to perform before and after the state transition occurs. The use of rules, states and events in the type system of the present invention results in a powerful approach to application development, namely the application modeling approach.

Figure 8:
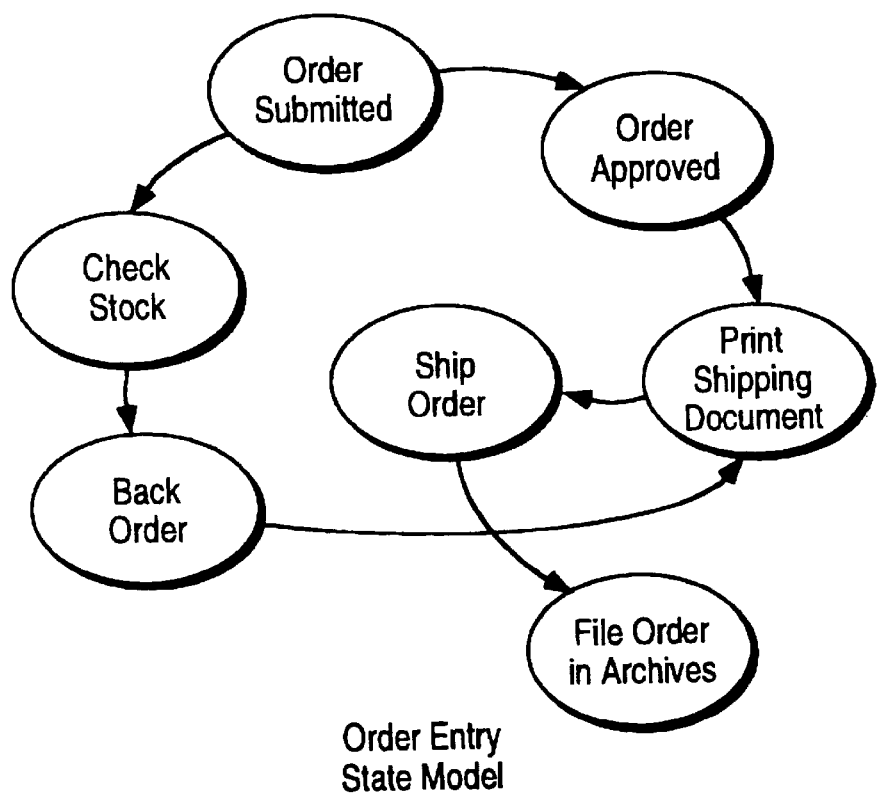
FIG. 8 illustrates an example state model for a sales order application.

An example of the application modeling approach may be illustrated through a sales order application. FIG. 8 illustrates an example state model for a sales order application. For the sales order application, the state model tracks the process through a complete cycle. Specifically, the state model of FIG. 8 contains a state for each step in the sales order cycle. The states designated in FIG. 8 are encompassed within a circle. The sales order state model starts with the a customer that submits an order. This is signified in the state model with the "Order Submitted" state. The state model also includes states for "Order Approval", "Check Stock", "Print Shipping Documents", "Ship Order", "Back Order", and "Archive Order."

In addition to defining each state to model the application, the application developer specifies permissible state transitions to define the behavior of the state model. Specifically, the user defines one or more state transitions that specify the permissible paths from each predecessor state to one or more successor states. In the state model example of FIG. 8, the lines and arrows that connect the states designate the legitimate state transitions that may occur from one state to another in the sales order application.

For the order entry state model shown in FIG. 8, the state model behavior is specified such that the state model transitions from the state "Check Stock" to the "Back Order" state only if the goods are not found to be in stock. Also, it is permissible to enter both the "Order Approval" state and the "Check Stock" state from the "Order Submitted" state. Furthermore, a rule, which requires approval of an order and printing of shipping documents before it is shipped, is specified such that the "Ship Order" state is entered from a path that includes the "Order Approved" state and the "Print Shipping Document" state. As illustrated by the above example, a real life application may be modeled to develop an application program based on the behavior of a state model.

States used in the type system of the present invention are defined at any point in an object by a user defined field. Thus, the states are not defined in terms of derived attributes that determine their values based on the current state. Therefore, the system does not directly perceive a significance of being in one state rather than another, but it only regulates the conditions under which a transition may occur from a predecessor state to one or more successor states.

In one embodiment, states are grouped together in composites for treatment as a single state. The composite state embodiment has application for transition testing purposes. Grouping states into composites may be analogized to grouping graphics objects in a drawing system. The groupings of objects in the drawing system permits treating, for some purposes, the graphics objects as a single group. For example, the single group of graphics objects may be moved together to retain relative spacing among individual objects.

In one implementation, applications may, if explicitly specified by an applications developer, foresee transition between states to occur even if the transition is forbidden by conditions specified earlier by a developer. This permits foreign objects and legacy applications to be interfaced to this system.

The events in the type system of the present invention may be associated with states. Events may be associated with any entry into or exit from a state. In addition, events may be associated with individual paths into or out of a state. Events associated with states are specified with run time triggers that cause the execution of arbitrary user specified procedures. For example, in the sales order application illustrated in the state model of FIG. 8, entry into the "Back Order" state may raise an event to "notify the customer of the delay."

Events may be used to link two independent applications. For example, order entry and accounts receivable applications may be run as stand alone applications. These applications may be linked through defining input and output events. For this example, the order entry and accounts receivable applications may be linked to interact as follows. The action of approving an order generates an event to create an invoice, and the action of creating an invoice generates an event to print order shipping documents. The action of shipping an order generates an event to mail the bill, and the act of receiving bill payments generates an event to close the order.

To implement the preceding actions between an order entry application and an accounts receivable application, an applications developer may define the following event filters defined in Table 1.

TABLE 1

| Output Event | Input Event |
| --- | --- |
| Order Entry: APPROVED | Receivables: CREATE |
| Receivables: NEW | Order Entry: PRINT |
| Order Entry: SHIPPED | Receivables: MAIL |
| Receivables: PAID | Order Entry: CLOSE |

For each event filter, any arguments required by the input events are defined. For the accounts receivable "create" event example, an argument for the "bill amount" requires definition such that the bill amount is equal to the order entry total.

As illustrated by the above example, state models and events provide a standard integration mechanism among applications. Through use of the type system events, users may define event filters to integrate a company's entire suite of applications, if desired, even if the applications derived from different parties. Even if an application was not developed using a state model, a user or later developer may easily build a state model for the applications afterwards, by invoking methods and then creating event filters for integrating the application with other applications.

Figure 9:
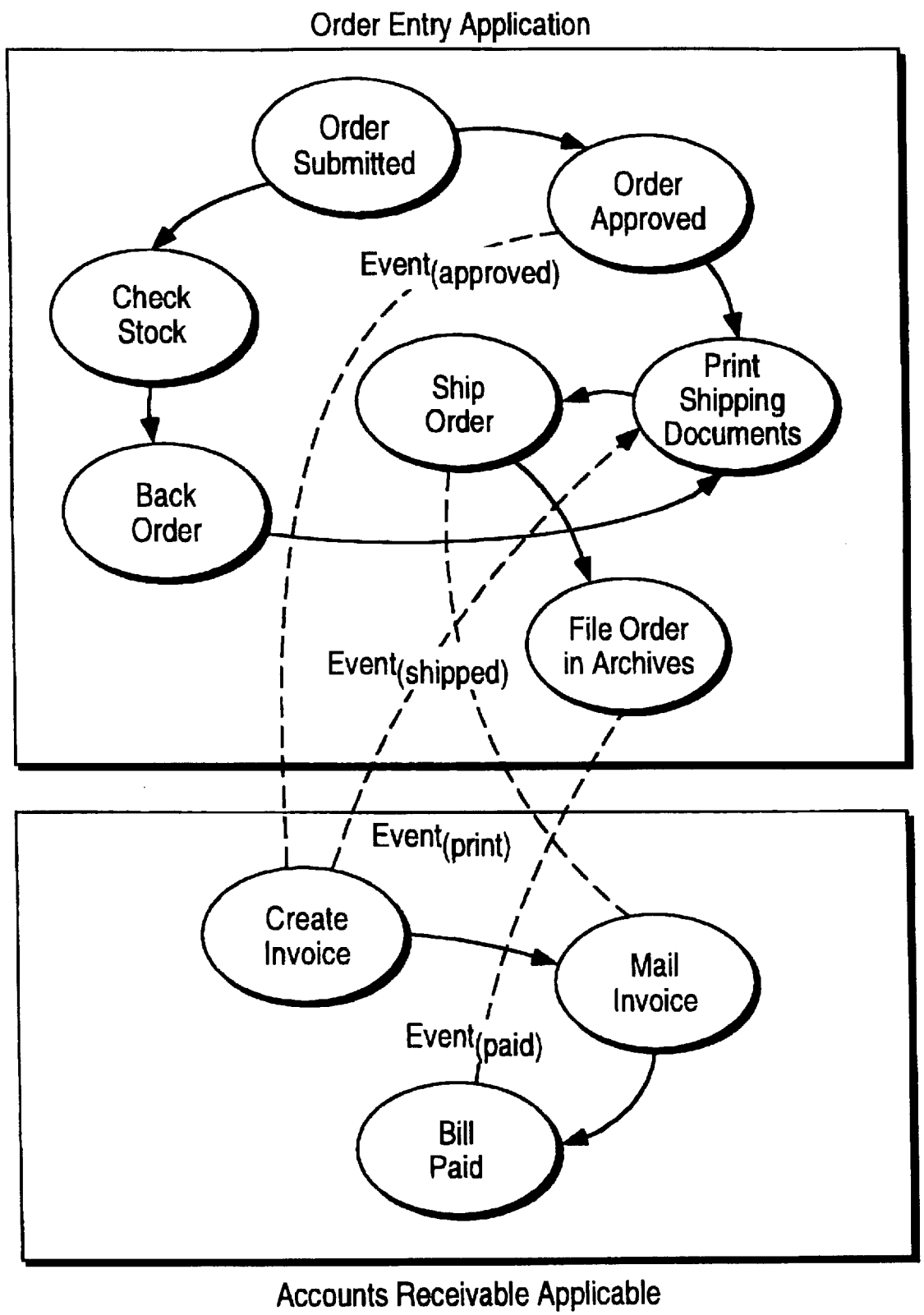
FIG. 9 illustrates state models for the example order entry and accounts receivable applications as well as their linking through events.

FIG. 9 illustrates state models for the example order entry and accounts receivable applications as well as their linking through events. The solid lines indicate the permissible state transitions, and the dashed lines indicate the events and their association with other states. Note that the functionality indicated by the state may be implemented in one or more methods. For example, a method is called to execute the "ship order" function, and the calling of the "ship order" method triggers the event "shipped." On the receiving end, a method is called to "mail invoice" to perform the functionality specified by this state.

As discussed above, rules may be triggered as states transition through a state model. Also, rules may cause the transition through the state model. An association may be described in terms of rules. For example, a rule may be defined such that if an attribute of an object is changed, then the action of the rule may change an attribute of a specified object (e.g., the triggering of the rule invokes a set attribute call to the associated object). Therefore, applications may be built by specifying when an object fires events and by defining events that cause motion through a state model. In turn, motion through the state model causes other events and other methods to be invoked.

Figure 10:
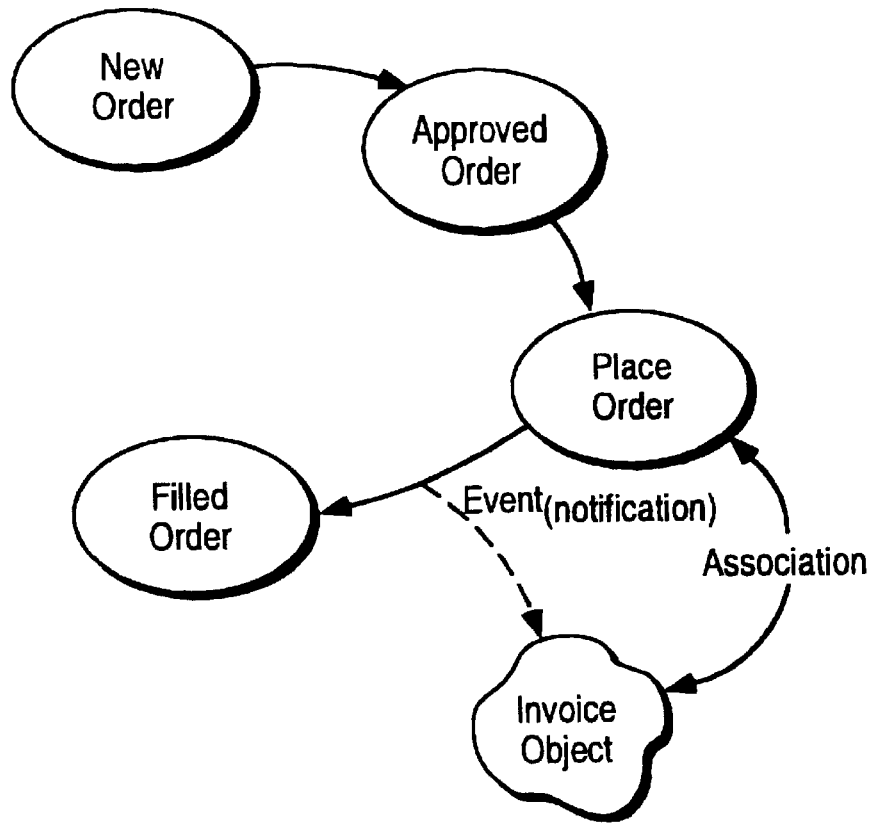
FIG. 10 illustrates a simplified state model consisting of a "New Order" state, an "Approved State", a "Place Order" state, and a "Filled Order" state.

Associations and events permit augmentation of state model behavior. FIG. 10 illustrates a simplified state model consisting of a "New Order" state, an "Approved State", a "Place Order" state, and a "Filled Order" state. In addition to this order entry state model, a user may wish to include an invoicing function that is implemented in an "Invoice Object." To accomplish this, the user associates the invoice object with the object used to implement the place order function. Also, the transition between the "Approved Order" state and the "Placed Order" state is utilized to fire off a notification event. During execution, when the "Place Order" state is transitioned to the "Filled Order" state, the invoice object receives the event notification to implement the account receivable functionality. Thus, additional functionality may be implemented to an existing state model through use of events and associations.

Figure 11:
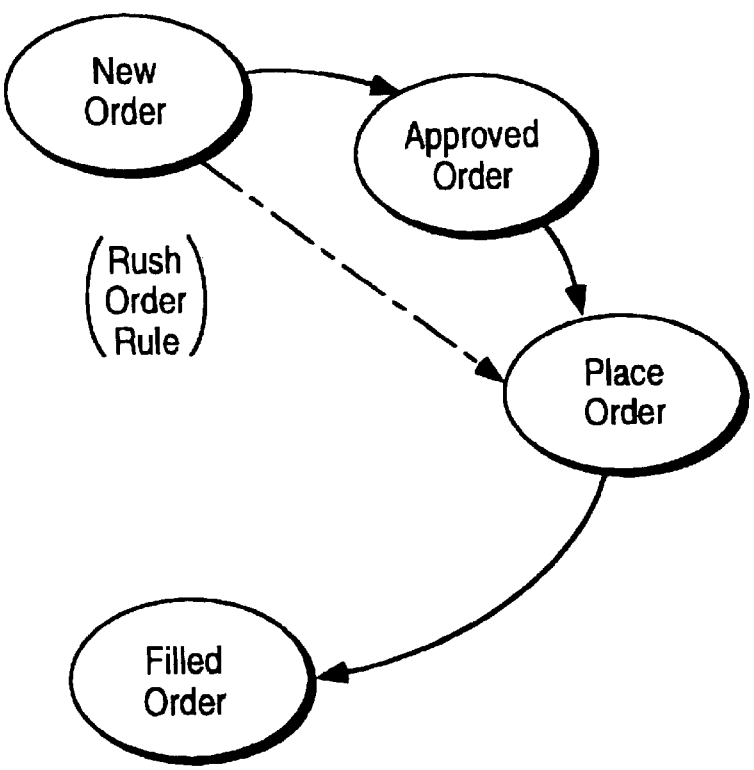
FIG. 11 illustrates adding a rule to the order entry state model of FIG. 10 to implement the specialized case of a rush order.

In addition to augmenting state models with events and associations to provide additional functionality, state models may be specialized after implementation. For the example order entry state model illustrated in FIG. 10, a user may wish to add specialized rules that apply to a rush order. FIG. 11 illustrates adding a rule to the order entry state model of FIG. 10 to implement the specialized case of a rush order. This example includes changing the permissible state transitions for a rush order. Specifically, to expedite the order entry process, a rush order rule permits transitioning from the "New Order" state directly to the "Place Order" state. Table 2 shows the rule trigger, condition, and action for implementing the rush order rule.

TABLE 2

| Rule Trigger | Condition | Action |
| --- | --- | --- |
| "New Order" State Entered | State of Rush Order attribute | Call "Place Order" Method |

The rule is triggered when the "New Order" state is entered. The object, which is associated with the state model, contains a rush order attribute. The state of the attribute determines whether the order is a rush order. If the rush order attribute indicates that the order is a rush order, then the action of calling both the place order method and the approved order method is executed. Alternatively, if the state of the rush order attribute indicates that this is not a rush order, then the normal state flow (e.g., transitioning only from the "New Order" to the "Approved order" state occurs). Thus, a rule that governs the behavior of a state model may be added without affecting the existing rules as well as without requiring new implementation of the state model.

In one embodiment for application program development, the application program developer describes the structural nature of a class type. The developer then describes states as well as the legal transitions among the states. Also, associations and events are used to link objects. Furthermore, rules may be used to specify object behavior. To support the events, event handlers may be written in 4GL scripting language. This technique allows combining state models, rules and handlers to implement a diagram. Thus, the behavior of objects, including the relationship among the objects, may be described, and the system will enforce this specified behavior at run time.

The type system of the present invention is dynamic. For example, a user may add or remove a rule which results in the rule immediately being enforced. In addition, a script may be generated that ties in additional rules for enforcement by the type system. Therefore, rules are dynamic such that they may be added and subsequently enforced by the system after a state model has been defined.

Encapsulation of Objects:

In general, object oriented systems encapsulate data and methods within an object. However, the notion of encapsulation may vary among object systems. For a system that enforces strict encapsulation, the attributes of an object can only be accessed by calling a method within the object. Other object oriented systems implement a loose encapsulation barrier. For example, a database management system for an object oriented database obtains the fastest access by directly querying the object oriented database to extract data. For this example, the object oriented database is said to have a weak encapsulation barrier because the database management system directly accesses the object.

To maintain a strict encapsulation barrier, the object, which includes the data or method, requires activation so that the object may be queried to obtain the information. For example, if an application requires querying a large number of objects in a object oriented database, then each object requires activation prior to the query to invoke a method on the object. From a system performance perspective, the activation of each object prior to the query results in a high cost. Therefore, there is a fundamental trade-off between enforcing a pure encapsulation barrier and maximizing system performance.

The uniform object model of the present invention supports both enforcing the integrity of a strict encapsulation barrier as well as penetrating the encapsulation barrier for certain applications, such as database management. Therefore, the unified object model retains the notion of encapsulation on an object by object basis. Specifically, the uniform object model of the present invention accesses or queries objects depending upon the requirements or properties of the specific object (e.g. strict encapsulation barrier for certain application objects and loose encapsulation barrier for data objects).

In the preferred embodiment, the system captures information about an object, such as a data object, and it generates a readable copy of the information outside the encapsulation barrier. The readable copy of the information is only generated with permission of the object (e.g. the object specifies whether a readable copy of the information is permissible). Therefore, for objects permitting a loose encapsulation barrier, such as objects from a database, the system directly queries the readable copy to elicit information about the object to maximize system performance. Alternatively, for objects that specify a strict encapsulation barrier, no copy is generated, and the object is activated to access or query the object. Although a copy of information about an object may be generated, the object is subject to change, thereby rendering the information outdated and perhaps incorrect. Consequently, based on this implementation, some objects in the uniform object model maintain a strict encapsulation barrier while other objects permit a loose encapsulation barrier.

Persistent Storage of Objects:

In the uniform object model of the present invention, all objects are capable of persistence. The object mediator 160 has a general notion of persistence of registered objects that it exposes to application clients. The client applications need not know of the details for accessing an object from a persistent store. For example, a relational database, such as an Oracle™ 7 database, stores data in terms of keys, columns and tables. A COM object stores objects in the form of compound documents. As illustrated by the above two systems, the details to access data and/or objects may be completely different for each system.

In order to implement persistence in the uniform object model of the present invention, a token is generated to redeem or activate an object. To the client, the token is opaque such that knowledge of the transaction details for accessing the associated data store are not required.

The logical repository 170 identifies objects that reside in different backend systems or data stores without the need to identify either the adapter that converted the instance or the adapter that converts data from its physical repository. To accomplish this, the adapters 110 generate tokens to operate their associated backend data sources relative to a particular storage device that is managed on another backend data source. In this way, all adapters operate without requiring the knowledge of other adapters. All of the objects are thus identified in persistence stores in terms of a general persistence mechanism.

The uniform object model of the present invention delivers to clients a uniform view of foreign objects; however, different instances of objects persist in different data sources. For example, object oriented databases are typically identified with an object identifier (e.g. a 32 bit integer similar to a persistent pointer). For a distributed object system, text is used to identify an object, such as a name. The integrated object oriented system 100 has the ability to handle different identification systems to permit clients to identify objects for exposure to the system. However, through use of the opaque token, the clients need not know the details of accessing the backend data sources. One embodiment for implementing the identification opaque token is described more fully below.

Different backend data sources have different capacities for executing transactions. For example, a main thrust in transactions for relational database systems is the ability to "back out" of the transaction. The uniform object model of the present invention provides a two phase transactional model at the abstract level. Through use of a single transactional model, clients need not be aware of details required to access objects persistent to a relational database or details required to access objects persistent to an object oriented database. Instead, clients adhere to a single transaction model, and the integrated object oriented system coordinates different transactions based on the specific backend data source. The transaction to a particular data source is limited by the capacity of the backend data source to support the operation. However, at the system level, this is not a least common denominator approach among all backend data sources.

In one embodiment, the uniform object model of the present invention implements a query dialect to permit querying of objects and backend data sources. Generally, associative access is utilized if more than a few instances of objects are configured in collections. In the integrated object oriented system, any collection is capable of supporting queries with varying degrees of support. Queries are issued in a single syntax on the abstract specification level. The integrated object oriented system parses the query out in a parse tree, and individual components are mapped for the specific backend data source. For example, for a relational database model, the query is parsed into a column or a space table. Thereafter, the entire query is recomposed in an adapter. In this way, all query dialects, such as SQL, are handled in the uniform object model while exposing a single dialect to the client. Therefore, the specific details of the query for a particular backend source is opaque to the client.

Figure 12:
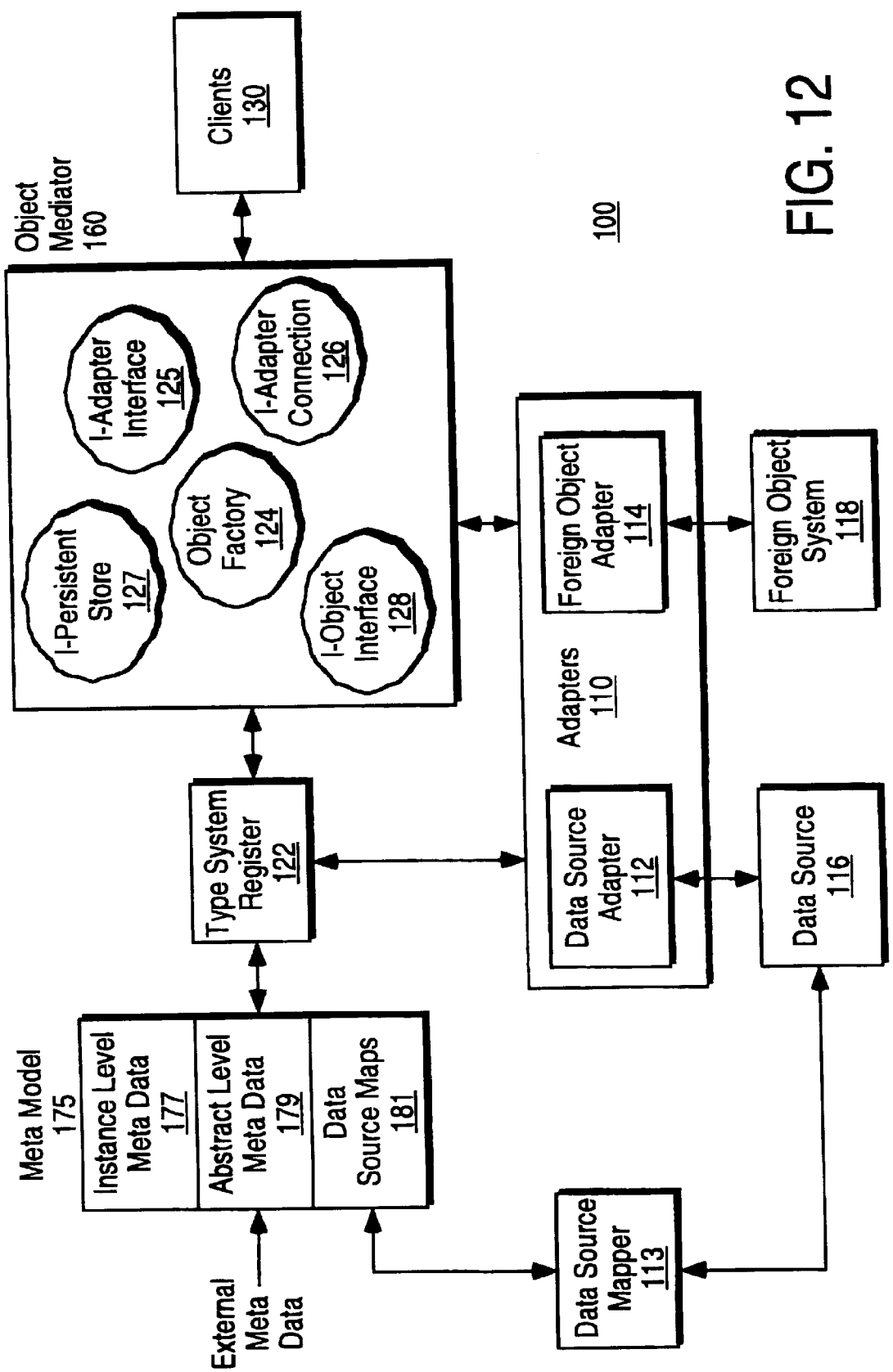
FIG. 12 is a block diagram of an object oriented environment that includes adapters configured in accordance with one embodiment of the present invention.

Adapters in an Object Oriented Environment:

FIG. 12 is a block diagram of an object oriented environment that includes adapters configured in accordance with one embodiment of the present invention. The object oriented environment has application for use in an object oriented software development environment. For this application, the object oriented software development environment is used to develop application programs using objects, defined by different object systems, and data, stored in different data sources. The application programs may be developed in conjunction with software development tools. To develop programs, the software development tools interact with the object oriented environment of the present invention. For purposes of simplicity and to avoid obscuring the present invention, FIG. 12 depicts software that operates in conjunction with the object oriented environment as clients 130. For example, clients 130 may include a property inspector software program that permits browsing of objects available in the object oriented software environment. The clients 130 are intended to represent a broad category of software programs including application development programs, and any software program may be configured to interact in an object oriented environment for use in conjunction with the object oriented environment of the present invention.

The object oriented environment includes an object mediator 160 to expose objects in the object oriented environment to the clients 130. To expose objects from foreign object systems and data sources, the object mediator 160 includes, in part, an I_Adapter connection object 126, an I_Object interface 128, I_Adapter interface 125, and I_Persistent store 127. In general, these software components permit clients 130 to interact with foreign object systems and data sources. As shown in FIG. 12, the object oriented environment includes a type system registry 122. Objects adapted into the object oriented environment are dynamically loaded and registered with the object mediator 160. Specifically, all adapters in the adapters 110 register foreign objects in the type system register 122. In this way, all meta data for all objects accessible in the object oriented environment 100 are contained in the meta model 175.

As shown in FIG. 12, the object oriented environment includes a data source 116 and a foreign object system 118. For purposes of simplicity, only one data source and foreign object system are shown; however, as is described more fully below, the object oriented environment may include several data sources and several foreign object systems. In general, the data source 116 stores data including the storage of objects (e.g., the objects persist in the data source 116). The foreign object system 118 represents an object oriented system that contains objects defined by a different type system than the objects of the object oriented environment 100. The foreign object systems may include abstract classes or types from any type system. For example, foreign object system 118 may include objects complying with the common object request broker architecture (CORBA), Microsoft's object linking and embedding (OLE II) environment, or Digital Equipment Corporation's common object model (COM).

The adapters 110 permit integration of data sources, such as data source 116, and foreign object systems, such as foreign object system 118, into a single object oriented environment. For this configuration, the adapters 110 include a data source adapter 112, which corresponds to the data source 116, and a foreign object adapter 114 that corresponds to the foreign object system 118. The object oriented environment 100 utilizes a meta model. The meta model 175 includes meta data to describe all objects in the system. The meta model 175 includes instance level meta data 177, abstract level meta data 179, and data source maps 181. As shown in FIG. 1, adapters 110 generate meta data to describe objects from foreign object systems. Also, meta data may be generated externally, such as through compiling of C++ classes in an extended interface definition language (EIDL) compiler.

Each class type utilized in the object oriented environment 100, regardless of the origin of the type, is registered in the type system register 122. The object factory 124 supports instantiation of foreign object types in conjunction with the adapters 110. The I_Adapter connection object 126 permits querying by the clients 130 for adapters, to obtain a connection to a data source or a foreign object system, as well as provide connectivity to the appropriate adapter. The I_Adapter interface 125 and I_Object interface 128 provide a means for the clients 130 to call a foreign object via the adapters 110.

The object oriented environment 100 also includes a data source mapper 113. In general, the data source mapper 113 maps data sources to abstract types in accordance with a specified type. The mapping is stored as data source maps 181. A data source mapper that maps relational databases to object types is described in U.S. patent application Ser. No., 08/901,738, entitled "Integrating Relational Databases In An Object Oriented Environment", inventor Jonathan Wetherbee, filed Jul. 25, 1997, now U.S. Pat. No. 5,937,409 which is expressly incorporated herein by reference.

In one embodiment, adapters include a relational adapter to support a relational data source. In general, the relational adapter is utilized as part of the persistence mechanism to access and query objects during run time. The relational adapter supports, at run time, general access to objects stored in a relational data source. To dynamically access an object stored in a relational data source, a client, through interface mechanisms in the object mediator 160, obtains a connection to the relational adapter. Once a connection is obtained, the relational adapter utilizes data source maps 181 (FIG. 1), expressed as meta data, to execute a desired transaction. In one embodiment, the data source maps 181 include class archive maps and storage type maps. In general, the class archive maps specify a mapping from a class type to an archived and the storage type maps map the archive to a data source. A relational mapper maps objects at the type system level, through generation of meta data, to describe mapping from a particular abstract class type to a relational data source. The relational mapper generates the data source maps 181 at a design time. During a subsequent run time, the relational adapter, in response to requests for instances of an abstract class type, utilizes the data source maps 181 to store attributes in columns of a relational table. Accordingly, the relational adapter utilizes the meta data (e.g., data source maps 181) to populate the attributes of a persistent object. U.S. patent application Ser. No., 08/901, 738, now U.S. Pat. No. 5,937,409 entitled "Integrating Relational Databases In An Object Oriented Environment" describes specific operations for mapping relational data sources to objects.

Adapter Functions in an Object Oriented Environment:

The adapters provide functions to support integration of data sources and foreign object systems into the object oriented environment. In general, the adapters provide a connection from clients operating within the object oriented environment to data sources and foreign object systems. The adapters, operating as connecters to data sources, permit querying of data and objects persistent in a data source supported by the adapter. The adapters also provide connectivity to foreign object systems to permit querying of foreign objects. In addition to providing connectivity, the adapters are utilized as part of a persistent mechanism to store objects of the object oriented environment in data sources. Furthermore, the foreign object adapter, operating as an implementer of a foreign object, instantiates, in conjunction with an object factory 124 (FIG. 12), instances of foreign objects.

To integrate foreign objects into the uniform object oriented environment (e.g., permit the clients to dynamically use the foreign objects), adapters implement foreign objects. The foreign object adapter operates as a surrogate object or an implementor of the foreign object in the object oriented environment. As an implementer, the foreign object adapter converts foreign objects to objects compatible with the object oriented environment. In one embodiment, the foreign object adapters implement foreign objects in accordance with the superset type system described above.

The foreign object adapters, when operating as implementer objects, add additional features supported by the type system of the object oriented environment. The object oriented environment, defined by a superset type system, includes enhancements to typical foreign type systems. For example, the type system permits declarative expression of rules, state models, associations, roles, and events. The rules, state models, associations, roles, and events are implemented for all uniform objects, including foreign objects, at the type system level. Although a foreign object has no notion of implementing these type system features at a type system level (e.g., rules, state models, associations, roles, and events), the foreign object adapter, operating as an implementer of the foreign object, implements these features for the foreign object being adapted. Thus, because the foreign object adapter implements objects to include the features of the uniform object oriented environment type system, the clients perceive the foreign object as an object originating from the uniform object oriented environment type system.

The foreign object adapters support bi-directional access to foreign object systems. To support bi-directional access, the foreign object adapters, in addition to converting objects from the foreign object system into the object oriented environment, convert objects from the object oriented environment to the foreign object system. For example, the adapter for a foreign object system maps the object oriented environment notion of an interface to the specifications of an interface for the foreign object system. Because all types are described in the meta data as uniform object oriented environment objects, the adapters are not required to convert from each individual type system to the foreign object system supported by the adapter. Thus, the adapters provide an efficient conversion to a foreign object system from other objects specified by a different type system. The bi-directional conversion includes objects converted from a foreign object system to the uniform object oriented environment and then subsequently converted to another foreign object system. An example of bi-directional conversion of a uniform object is described more fully below.

Figure 13:
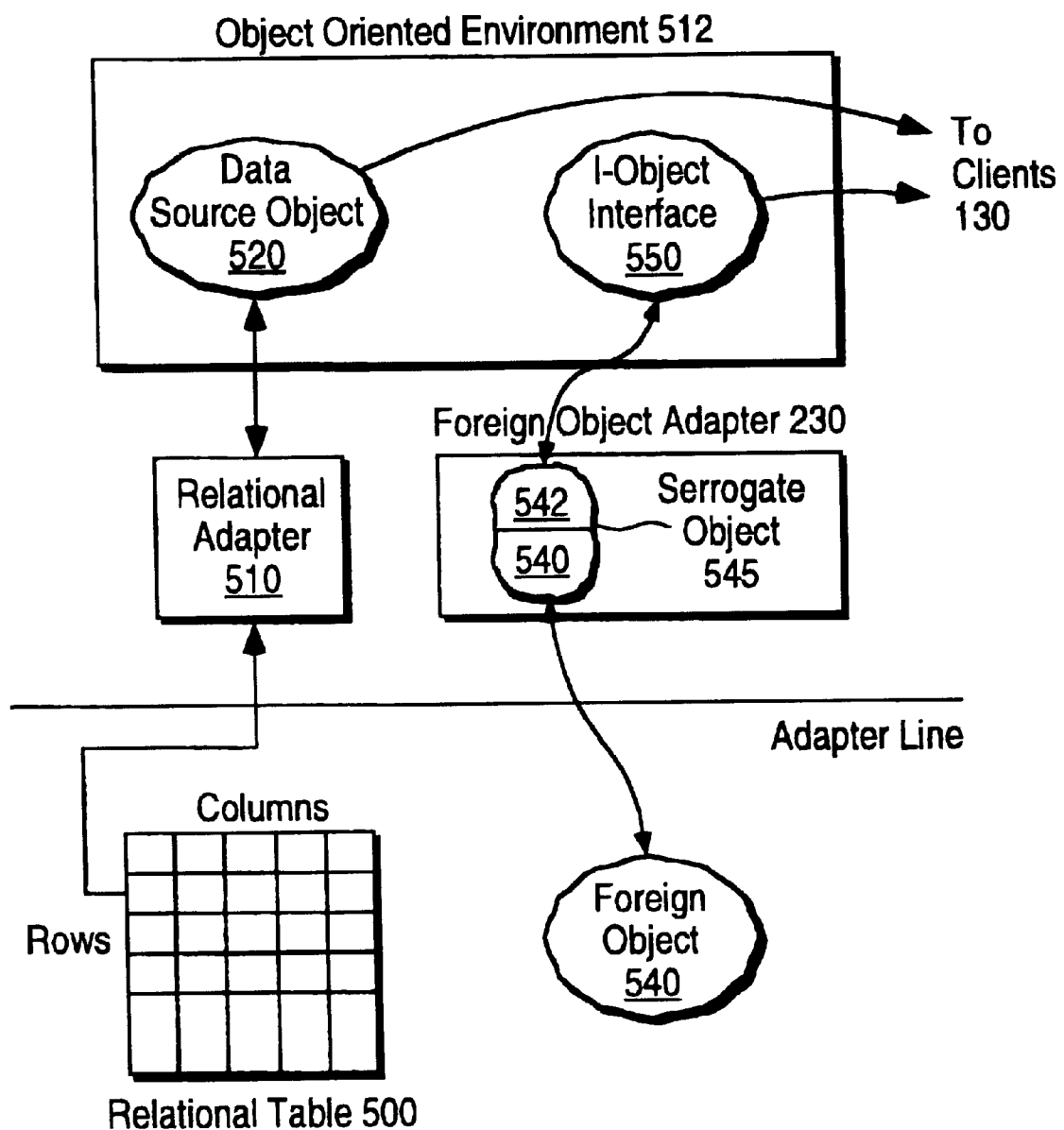
FIG. 13 illustrates one embodiment for adapting data sources and foreign objects into an object oriented environment.

As discussed above, foreign object adapters operate as implementers to integrate foreign objects into the object oriented environment. Also, as discussed above, the data source adapters and the data source mappers present data from data sources, such as relational databases, as objects to clients. FIG. 13 illustrates one embodiment for adapting data sources and foreign objects into an object oriented environment. For this illustration, the data source consists of a relational table 500 from a relational database. The relational table 500 is arranged in a plurality of columns, extending in a vertical direction, and a plurality of rows, that extend in a horizontal direction. For this illustration of adapting data sources into the object oriented environment, the relational adapter 510 transforms a row source of the relational table 500 into an object, labeled 520. The data source object 520 conforms to the type system of the object oriented environment 512. Thus, adapters may be characterized as mechanisms that provide a line between a data source, located below the adapter line, and objects located above the adapter line. Thus, for this example, the relational adapter 510 exposes the rows of a relational table as an object to the client.

As discussed more fully below, in one embodiment, the adapters provide generic interfaces that support each data source in the same manner. However, the adapters, instead of treating data sources in accordance with the operation of data source, present to the client the data source in the manner the object oriented environment operates (e.g., the relational adapters convert data sources to objects). As discussed in the background, prior art database interfaces translate the data source up to objects in a type system, thereby requiring clients to operate on data based on the particular configuration of the underlying data source. For example, to populate a row in a relational table, these prior art systems require the objects to handle row sources. The adapters of the present invention translate or bring the data source into the object oriented environment in the form of an object. Thus, client applications are not required to maintain details about the specifics of a data source. Instead, the object 520 (FIG. 13), adapted by the relational adapter 510, may be utilized by a client in a manner similar to all objects in the object oriented environment.

A client, operating within the object oriented environment, may be a property inspector application that permits browsing the types registered in the system. In part, a property inspector application lays out the attributes of a type registered within the system. For example, a property inspector may browse a button object, which renders buttons to facilitate building of a user interface, to permit inspection of attributes, such as coordinates of the button, color of the button, etc. For this example, the button object may persist in the relational table 500. To view a row source of the relational table, the property inspector requires additional functionality to translate the row source, containing the attributes of the button object, into a format usable by the property inspector. However, with use of a relational adapter and a relational mapper, the property inspector requires no new functionality to browse the attribute of the object data source 520 (e.g., the row source has been converted to an object registered with the type system). Thus, as illustrated by the above example, data source adapters do not merely provide an interface to a data source, but instead implement objects from data stored in data sources for use in the object oriented environment.

To adapt a foreign object into the object oriented environment 512, the adapters include a foreign object adapter 530. In general, the foreign object adapter 530 operates as a surrogate object for the foreign object 540, thereby adapting the foreign object 540, specified in accordance with a foreign type system, into the type system of the object oriented environment 512. As shown in FIG. 13, I_Object interface 550, used by clients to call objects, directly calls the surrogate object 545. The surrogate object 545 is registered with the type system of the object oriented environment 512, and therefore is accessible for use by clients. Thus, to utilize the foreign object 540, the client calls, via the I_Object interface 550, the surrogate object 545. As shown in FIG. 13, the surrogate object 545 depicts a foreign object portion 540 and a superset type system portion 542. The foreign object portion 540 of the surrogate object 545 maintains all the functionality included in the original foreign object 540. In addition, the "cap" 542 on the foreign object 540 depicts the additional functionality implemented by the foreign object adapter 530 to effectively make the surrogate object 545 a full-fledged object in the oriented system environment 512. The surrogate object 545 is registered as an object in the type system registry 122, and meta data is stored to fully describe the object. Thus, the surrogate object 545 implements the foreign object 540 as a full-fledged object in accordance with the type system of the object oriented environment 512.

The surrogate object 545 may be utilized by a client to generate an instance of the foreign object 540 (e.g., foreign object 540 is an abstract type). A client, such as a property inspector application, may query the surrogate object 545 to extract information about the object. As shown in FIG. 13, in response to a call to the surrogate object 545, the client directly calls the foreign object adapter 530 (e.g., the adapter acts as the implementer for the foreign object 540). Thus, the adapter does not translate, redirect or funnel the call to the foreign object system. To create instances of the foreign object 540, the foreign object adapter 530 is the surrogate implementer of the object as well as an intermediator for the object between the object oriented environment and the foreign object system (e.g., the foreign object services).

The foreign object 540 has all of the functionality of any object registered with the type system of the object oriented environment. If a system only puts a wrapper on a type, the type does not have complete functionality in that the type is only exposed for browsing purposes. In contrast, the adapters of the present invention import objects so that they are full fledged object oriented environment objects that may be manipulated, browsed, as well as used to create instances.

Because the foreign object adapter receives direct calls from interface methods, the foreign object adapter implements additional features unique to the type system of the object oriented environment. When a foreign object adapter is implementing a foreign object, there is no buffer utilized to subsequently flush the transaction to the services of the foreign object system. Instead, the foreign object system maintains the status of the attributes for the foreign object. If a client of the foreign object system queries the foreign object, then the status of the object is always maintained within the foreign object system because of the nature of the implementation.

Figure 14:
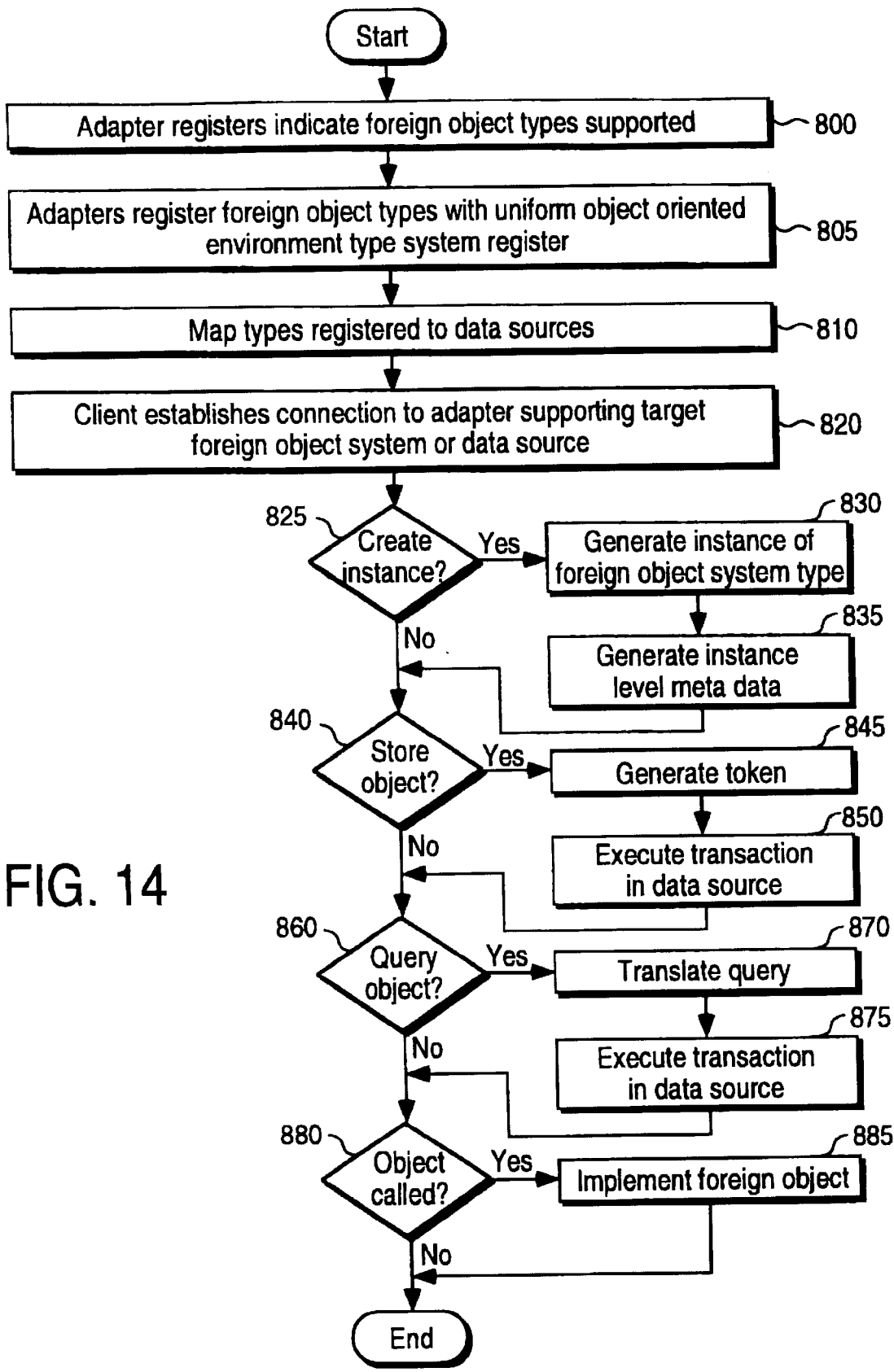
FIG. 14 is a flow diagram illustrating certain functions of an adapter operating in an object oriented environment.

FIG. 14 is a flow diagram illustrating certain functions of an adapter operating in an object oriented environment. As discussed above, adapters are configured to adapt one or more foreign object systems and data sources. As shown in block 800, adapters register foreign object types, in each adapter registry, to reflect the foreign object types that the adapter supports. As shown in block 805, the adapters populate the object oriented environment type system registry with type system level meta data to register foreign object class types being adapted into the object oriented environment. The adapters register all foreign objects with the type system registry that are accessible in the object oriented environment (e.g., foreign objects that are dynamically accessible to clients). To register types with the type system registry, the adapters disclose the capability of foreign objects and data source objects being adapted. For example, if the foreign object contains methods, attributes, and properties, then the registration into the type system registry of the object oriented environment reflects the characteristics and capabilities of the methods, attributes and properties of the foreign object. Also, for a native data source object, the adapter may reflect the capability of the "get/set attribute" method to get and set attributes on the corresponding data source object.

As shown in block 810 of FIG. 14, types are mapped to data sources. In one embodiment, a data source mapper 113 (FIG. 1), during a design time, maps types registered in the object oriented environment to one or more data sources. For example, if instances of objects derived from compiled C++ type classes are to be stored in a relational data source, then a relational mapper maps the C++ class types to tables in the relational data source. The mapping presents a bi-directional conversion from type classes to data sources such that native data source objects may be converted from the data source to a class type previously mapped.

During run time, adapters are utilized as connecters to connect data sources and foreign object systems to clients operating in the object oriented environment. As shown in block 820 of FIG. 14, during run time, clients establish a connection to an adapter to perform an operation in a target foreign object system or data source. Specifically, clients browse the registries of one or more adapters to determine the foreign object systems and data sources that each adapter supports. After obtaining a connection, clients may execute operates, through the adapter, to the target data sources or foreign object systems. The flow diagram of FIG. 14 illustrates some of the general functions performed by the adapters once a connection is obtained.

During run time, the adapters, via an object factory, generate instances of foreign objects and native data source objects as uniform object model objects. If a client of the object oriented environment requests an instance of a foreign object for which the adapter supports, then the adapter generates an instance of the foreign object as well as generates instance level meta data for the type system registry. The functions performed to create an instance of a foreign object are shown in blocks 825, 830, and 835 of FIG. 14.

The adapters execute transactions to store objects, during run time, to support persistence of objects in data sources (e.g., the adapters are part of the persistence mechanism). If a client of the object oriented environment requests storage of an object to a data source for which the adapter supports, then the adapter identifies to the object oriented environment that the object is persistent in the data source as shown in blocks 840 and 845 of FIG. 14. In one embodiment, to support the persistence mechanism, the adapters generate a token to identify that an object is persistent in the data source supported by the adapter. Through the use of tokens, the persistence mechanism is implemented such that clients need not be aware of details required to store the object in the data source (e.g., clients need not identify the implementor adapter or the persistence adapter). In addition to generating the token, the adapter executes a transaction, particular to the data source, to store the object in the data source as shown in block 850. One embodiment for implementing a persistence mechanism in an object oriented environment using adapters is described more fully below.

During run time, adapters provide connectivity to data sources to permit clients to query objects persistent in the supported data sources. As shown in blocks 860 and 870, if a client of the object oriented environment querys a data source for which the adapter supports, then the adapter translates the query to a form required by the target data source. In addition, as shown in block 875, the adapter executes the transaction to the data source (e.g., dispatches the query to the data source). In response to the query, the adapter generates an object, for use in the object oriented environment, from the data source based on a type specified in the original query. For example, a relational adapter augments a row in a table of a relational database to appear as a uniform object model object. Operations to query objects via adapters is described more fully below.

During run time, clients of the object oriented environment may call methods of foreign objects. As shown in blocks 880 and 885 of FIG. 14, an adapter, in response to a method call, implements the foreign object in the object oriented environment. The object oriented environment objects, adapted from foreign object systems and data sources, provide a first direction of conversion (e.g., converting external foreign objects and data sources into uniform object oriented environment objects). To fully adapt foreign objects, the adapter implements the functionality of the corresponding foreign object system type, and the adapter adds the enhancements provided with the type system of the uniform object oriented environment.

As part of the connectivity function, the adapters translate object oriented environment objects to objects compatible with foreign object systems regardless of the origin of the object being translated. Because all objects are described in the meta data, adapters convert any uniform object oriented environment object to a foreign object system. The conversion from a uniform object oriented environment object to a foreign object system provides a second direction of conversion in the adapters.

As discussed above, the adapters of the present invention provide bi-directional access to and from data sources and foreign object systems. Because the adapters translate data into full fledged uniform object model objects, a client of a foreign object system may utilize resources from other systems, as well as view objects originated in the object oriented environment. For example, a client of CORBA may view a COM object, via the CORBA adapter, as if the object were a CORBA object. For this example, the CORBA adapter browses the meta data of the COM object, which appears as a uniform object model object in the type system registry, and converts the uniform object oriented environment object into a CORBA compatible object.

Connecting to an Adapter:

To access a data source or foreign object system, a client first obtains a connection to an adapter that supports the corresponding data source or foreign object system. In one embodiment, a client utilizes functionality in the object mediator 160 (FIG. 12) to obtain a connection to the appropriate adapter. For this embodiment, the object mediator 160 maintains an adapter registry that indicates adapter support of data sources and foreign object systems. A client utilizes the information in the adapter registry to select the appropriate adapter that supports the data source or foreign object system for which connectivity is sought.

In one embodiment, the object mediator 160 includes an I_Adapter connection interface 126 that provides the software functionality to connect a client to an adapter. In general, a client utilizes the I_Adapter connection interface 126 to execute functions that require a connection to a data source or a foreign object system. The I_Adapter connection interface 126 is the root to all adapters. For this embodiment, all adapters, which support connectivity to a data source or a foreign object system, support the I_Adapter connection interface 126. Thus, clients interact with all the adapters in the same way via the I_Adapter connection interface 126.

In one embodiment, the I_Adapter connection interface 126 supports a method to create an adapter connection and a method to find an adapter. To locate an appropriate adapter, the client queries for the interface to obtain information on the appropriate adapter. For example, if a client desires connectivity to a COM foreign object system, then the client queries for an interface to the adapter that supports the COM foreign object system. After identifying the adapter that supports the target data source or foreign object system, the client establishes a connection to the adapter via the I_Adapter connection interface 126. Specifically, to obtain an adapter connection through the I_Adapter connection interface 126, a client generates a login string. In response, the I_Adapter connection interface 126 returns an adapter connection. Specifically, the I_Adapter connection interface 126 returns a root pointer to the adapter that supports the foreign object system or data source. Note that a client may connect to more than one data source, thereby requiring connectivity to multiple adapters that support the different data sources or foreign object systems. At any one time, a connection to an adapter may have multiple transactions pending.

In one embodiment, the object mediator 160 includes an I_Adapter interface, label 125 on FIG. 12. The clients use the I_Adapter interface 125 to execute functionality in a previously connected adapter. The I_Adapter connection interface 125 supports a "query sync" method and a "create object" method. For this embodiment, once a connection is established, the client calls the "query sync" method to query an object supported by the adapter. The client calls the "create object" method to instantiate or create an instance of a specified class type.

As shown in FIG. 12, the object mediator 160 also includes the interface I_Persistent store 127. In general, the clients utilize the I_Persistent store interface to store an object so that the object persists in a data source. All adapters, which support storage of objects in their corresponding data source, support the I_Persistent store interface 127. For example, a CORBA adapter, which supports connectivity to the CORBA foreign object system, does not support the I_Persistent store interface 127 because objects that originate in the object oriented environment do not persist in the CORBA foreign object system (e.g., instances of CORBA objects persist in data sources, such as a relational or object oriented database). An adapter, which supports a relational data source, supports both the I_Adapter connection and I_Persistent store interfaces. The operation of a client to connect to an adapter via the I_Persistent store interface is analogous to connection to the I_Adapter connection interface discussed above.

Implementing Type System Functions:

As discussed above, to adapt foreign objects into the uniform object oriented environment, adapters operate as surrogate objects or implementors for the foreign objects. For the embodiment illustrated in FIG. 13, method calls to a foreign object are directed to the adapter for which a connection has been established. Adapters, when implementing foreign objects, put a "cap" over the foreign object to implement functionality provided through the type system of the object oriented environment. Under certain circumstances, the adapter may execute a script to implement the functionality provided through the type system.

In one embodiment, the object oriented environment supports functionality at the type system level. For this embodiment, the type system supports implementing rules, events, associations, states, and triggers at the type system level. For this embodiment, the rules, events, associations, states, and trigger information are stored as meta data. The object oriented environment accepts declarative scripts, such as through fourth generation languages (4GL) scripts, as a means to provide functionality to the system. The declarative scripts may include one or more rules that define the behavior of an application program.

In one embodiment, adapters maintain rules, events, associations, states, and triggers to support the foreign object or data source being implemented. For example, when a method in a foreign object is called, the foreign object adapter browses the type system meta data to ascertain the applicability of rules, events, associations, states, and triggers. A script in the uniform object oriented environment may be executed to implement the functionality. If a rule exists, the adapter determines whether the condition of the rule is met. If the condition is met, then the adapter executes appropriate action to enforce the rule (e.g., executes a script in the uniform object oriented environment). To implement events, foreign object adapters browse meta data to determine the existence or non-existence of an event and to determine appropriate action (e.g. generation of a "before", "after" or "do" event). Similarly, all type system enhancements may be executed by the adapter to provide full functionality for the foreign object being implemented.

If during execution of a declarative script, which incorporates one or more rules, a foreign object is called, then the corresponding foreign object adapter, which implements the foreign object, enforces the rule. To enforce the rule for the foreign object, the foreign object adapter determines the applicability of the rule on the foreign object method being called. For example, the rule may require the system to be in a pre-defined state prior to execution of a method in the foreign object. When the method in the foreign object is called, the foreign object adapter determines, from the meta data, whether the system is in the pre-defined state. If the system is not in the pre-defined state, the foreign object adapter returns a fault or an exception to the caller. Otherwise, the method in the foreign object is executed.

In one embodiment, the type system functionality includes enforcing triggers in a relational data source. In general, a trigger is fired upon the occurrence of a pre-determined event or action. For example, a trigger may specify that if a value of a column in a relational table exceeds a predetermined value, then a transaction to insert that row in the relational table fails. For this example, the relational adapter determines whether the data for the row source satisfies the condition by determining whether the value of the column in the relational table exceeds the predetermined value. If the condition is met, the relational adapter executes the transaction to store the row in the relational table. If the condition is not met (e.g., the value of the column exceeds the predetermined value), the relational adapter aborts the transaction to the relational data source.

When functionality on the type system level is added to a foreign object, such as the enforcement of a rule prior to execution of a method in a foreign object, the functionality is provided completely within the object oriented environment. Thus, the uniform object oriented environment type system enhancements do not extend beyond the adapter into the foreign object system.

The foreign object adapters are used to create instances of objects defined by foreign object systems. A client may call a "Get Type" method to import a foreign object into the object oriented environment. In general, the Get Type method obtains a foreign object class type from a foreign object system. For example, a client of the object oriented environment may execute a Get Type method to obtain a CORBA object from CORBA services. In general, the "Get Type" method, implemented by the corresponding foreign object adapter, queries the foreign object. Specifically, for this operation, the foreign object adapter browses the registry of the foreign object system, and the foreign object adapter looks-up foreign object types registered with the foreign object system. Using the type system information, the foreign object adapter creates class types for the object oriented environment by mapping the foreign object class type to a class type compatible with the object oriented environment. The foreign object adapter registers the newly created object oriented environment class type for the foreign object in the adapter registry.

To create an instance of the foreign object system object, the object mediator 160 assigns an identification through a global server. The identification is required to create a type for use in the object oriented environment. The global server browses the registry of each adapter to determine whether the adapter has objects registered for that type. If the global server locates a type in the adapter registry, then the global server receives an object factory. The global server uses the object factory to create an instance of the object.

In one embodiment, the adapters utilize archives to copy objects. In general, archives are data structures defined in the computer system memory. The archives includes a plurality of entries or members corresponding to the type of an object that the archive supports. Adapters use archives to transfer data to a class type. For example, adapters use archives to move objects from a persistent state (e.g., objects stored in a data source) to an object implementation in the object oriented environment. Archive type maps define the mapping between a class type and an archive. In one embodiment that uses archives, the adapter receives an archive through an interface, and the adapter loads the archive to populate data in the archive structure. Furthermore, archives are used by adapters to copy an implemented objected from one adapter to a second adapter. To accomplish this, the first adapter passes a pointer an archive to the second adapter. The second adapter utilizes the archive to copy class type data to the first adapter.

As discussed fully below, meta data is stored in a registry for class types compiled through an extended interface definition language (EIDL) compiler. In one embodiment, the adapters for the uniform object oriented environment include an extended interface definition language (EIDL) adapter. For each class type registered, there is an implementation provided either through the C++ compiled classes or through the EIDL adapter. The EIDL adapter contains all the C++ object factories registered within. The EIDL adapter does not support a foreign object system or data source so it implements an execution engine to execute a "where" clause in a SQL statement. This requires running through every object in a collection of objects queried.

A Persistence Mechanism Using Adapters:

As discussed above, the object oriented environment exposes to clients a uniform view of foreign objects; however, different instances of objects persist in different data sources. The different data sources and foreign object systems have mechanisms to identify the data and objects, as well as different protocols to execute transactions to access data and/or objects. For example, a relational data source, such as an Oracle™ 7 database, identifies data in terms of keys, columns and tables. A COM object stores objects in the form of compound documents. Also, object oriented databases typically identify objects with an object identifier (e.g., a 32 bit integer similar to a persistent pointer). Furthermore, in a distributed object system, text is used to identify an object, such as a name. As illustrated by the above examples, the details to access data and/or objects, including identification of the data and/or objects, may be completely different for each system. The object oriented environment has the ability to handle different identification systems to permit the object oriented environment to uniquely identify objects for exposure to clients.

In the object oriented environment, all objects are capable of persistence. The object mediator 160 (FIG. 12) has a general notion of persistence of registered objects that it exposes to clients. The clients are not required to maintain information to access an object from a data source. In general, the logical repository 170 (FIG. 12) identifies objects that reside or persist in different data sources without identifying either the adapter that adapted the instance into the object oriented environment (e.g., the adapter that implements a foreign object from a foreign object system) or the adapter that connects the object oriented environment to the data source that stores the object (e.g., the adapter that connects the client to the physical repository).

In one embodiment, the uniform object oriented environment uses tokens to implement the persistence mechanism to redeem or activate an object. The token is opaque to the clients such that the client does not retain knowledge of the transactional details to access the associated data source. The adapters generate tokens to operate their associated data sources and foreign object systems relative to another adapter that manages the persistent data source. Based on this persistence mechanism, all adapters operate without requiring the knowledge of other adapters. Thus, all of the objects in the object oriented environment are identified in data sources in terms of the general persistence mechanism.

Figure 15:
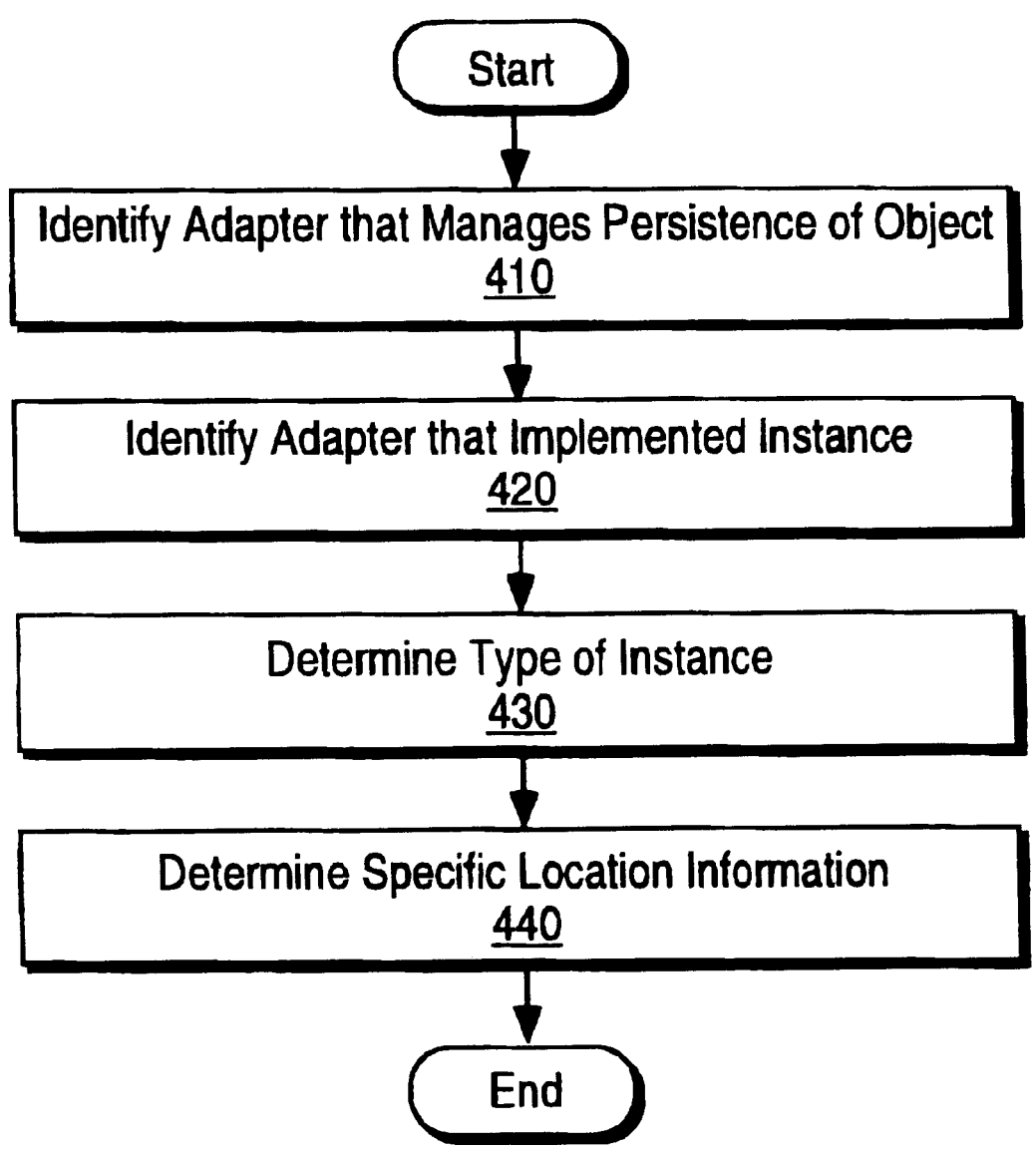
FIG. 15 is a flow diagram illustrating one embodiment for persistence processing.

In one embodiment, to implement the opaque identification token, the object goes through successive services for processing. At the end of the processing chain, the object is introduced. FIG. 15 is a flow diagram illustrating one embodiment for persistence processing. In this embodiment, the adapter that manages the persistence of the object is identified as shown in block 410 of FIG. 15. Also, the adapter that implemented the object is also identified as shown in block 420. For example, as illustrated in FIG. 15, the persistence data source, supported by a relational adapter 190, may be a relational database 240, and the implemented adapter may be an OLE adapter 220 implementing an OLE object (e.g., an OLE object stored in a relational database). As shown in block 430 of FIG. 15, the type of the instance is determined. For the object oriented environment, meta data for the corresponding type is browsed. Furthermore, to specifically locate the object in the data source, specific location details to identify the instance, such as the column and table information for a relational database, are determined as shown in block 440. From the abstract point of view of the object oriented environment, access to all objects may be treated in a uniform fashion. Through use of this paradigm, a completely open ended system accommodates any transaction for any data source and foreign object system. Consequently, the uniform object oriented environment has a notion of persistence that provides a way of storing and identifying objects using standard definitions of persistence and storage.

Querying Data and Objects with Adapters:

In one embodiment, the object oriented environment implements a query language dialect to permit querying of objects and data sources. Generally, associative access is utilized if more than a few instances of objects are configured in collections. In the object oriented environment, any collection is capable of supporting queries with varying degrees of support. In one embodiment, queries are issued in a single syntax in the uniform object oriented environment. In general, an adapter, which supports the target data source, parses the query out in a parse tree, and individual components are mapped to the specific data source being supported. For example, for a relational database, a relational adapter parses the query into a column of a relational table. Thereafter, the entire query is recomposed in the adapter. In this way, all query dialects, such as the various dialects of SQL, are handled in the object oriented environment while exposing a single query language dialect to clients. Therefore, the specific details of the query for a particular data source is opaque to the client.

Figure 16:
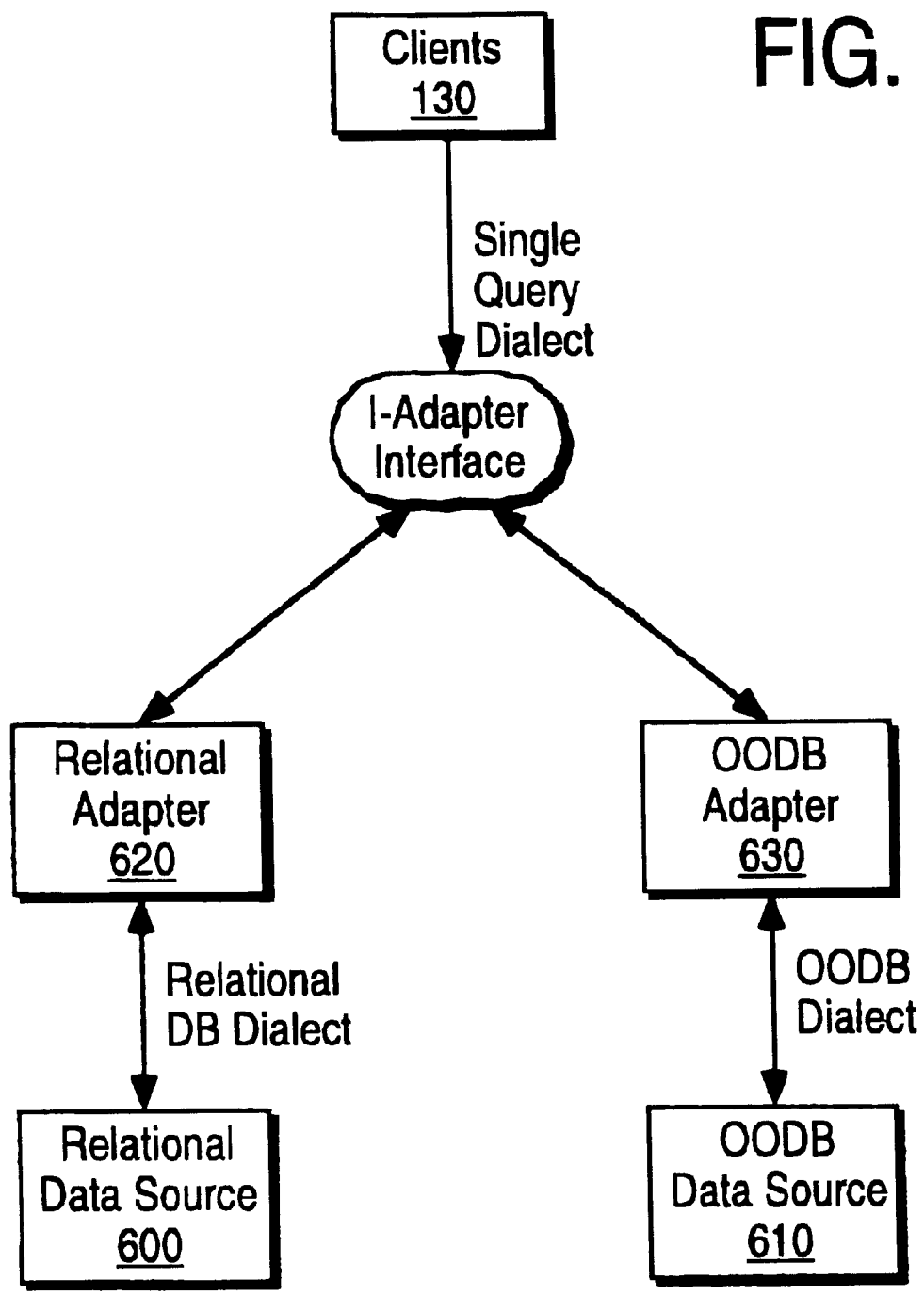
FIG. 16 is a block diagram illustrating a query operation using adapters.

FIG. 16 is a block diagram illustrating a query operation using adapters. A client, labeled 130 in FIG. 16, generates a query to extract information from a data source. For this example embodiment, the uniform object oriented environment integrates data source 500 and data source 510. The data source 500 and data source 510 are different data sources. For example, the data source 500 may be a relational database, and the data source 510 may be an object oriented database. The data source 500 is adapted into the object oriented environment via a relational adapter 520, and the data source 510 is adapted via an object oriented database (ODBC) adapter 530. To retrieve a table in the relational database 500, the client generates a query for the uniform object oriented environment based on a predetermined query language dialect. In one embodiment, the query language is a SQL3/Oracle 8 dialect. The relational adapter 520 receives the query through the I_Adapter interface, and the relational adapter 520 parses the parse tree contained in the query. In turn, the relational adapter 520 generates a query for the data source 500 specific to that particular data source. For example, if the data source 500 supports a SQL2 dialect, then the relational adapter 520 parses the information from the original query, and reformulates the query in accordance with the SQL2 dialect compatible with the data source 500. Similarly, the OODB adapter 530 receives queries in accordance with the single dialect query language. In turn, the OODB adapter 530 generates a query, different than the query compatible with the data source 500, for the data source 510. Thus, to execute a query n two different data sources that utilize different query language dialects, the client is only required to generate queries in a single query language dialect.

Figure 17:
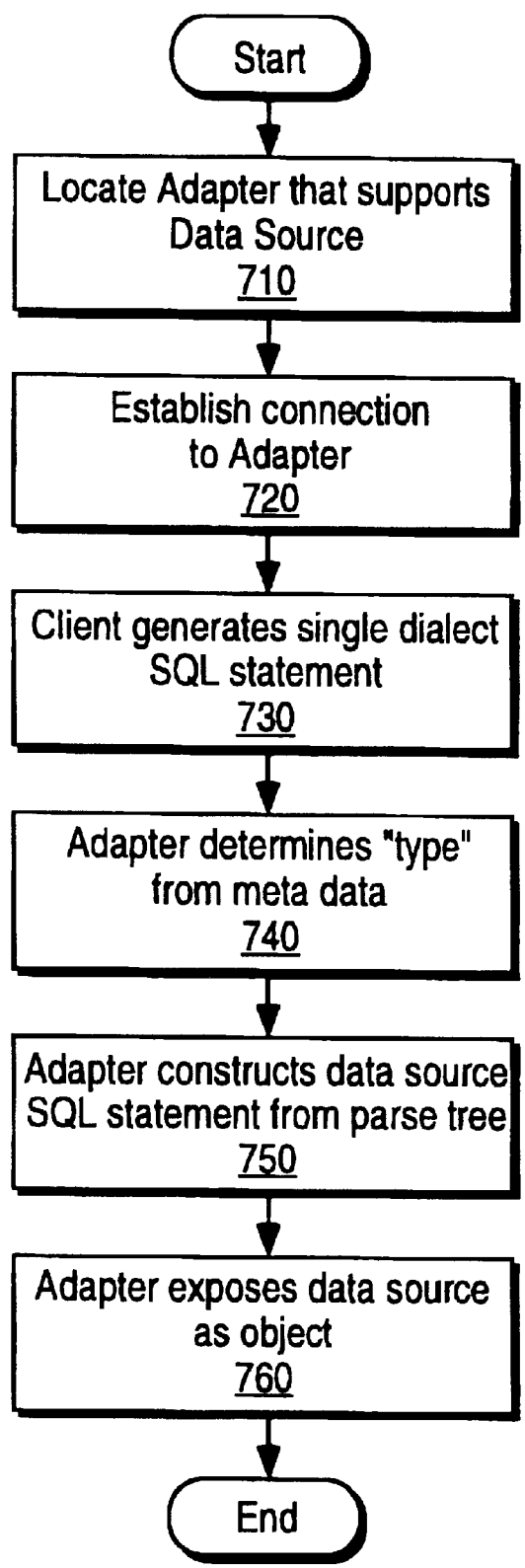
FIG. 17 is a flow diagram illustrating one embodiment for executing query operations utilizing adapters.
Figure 18:
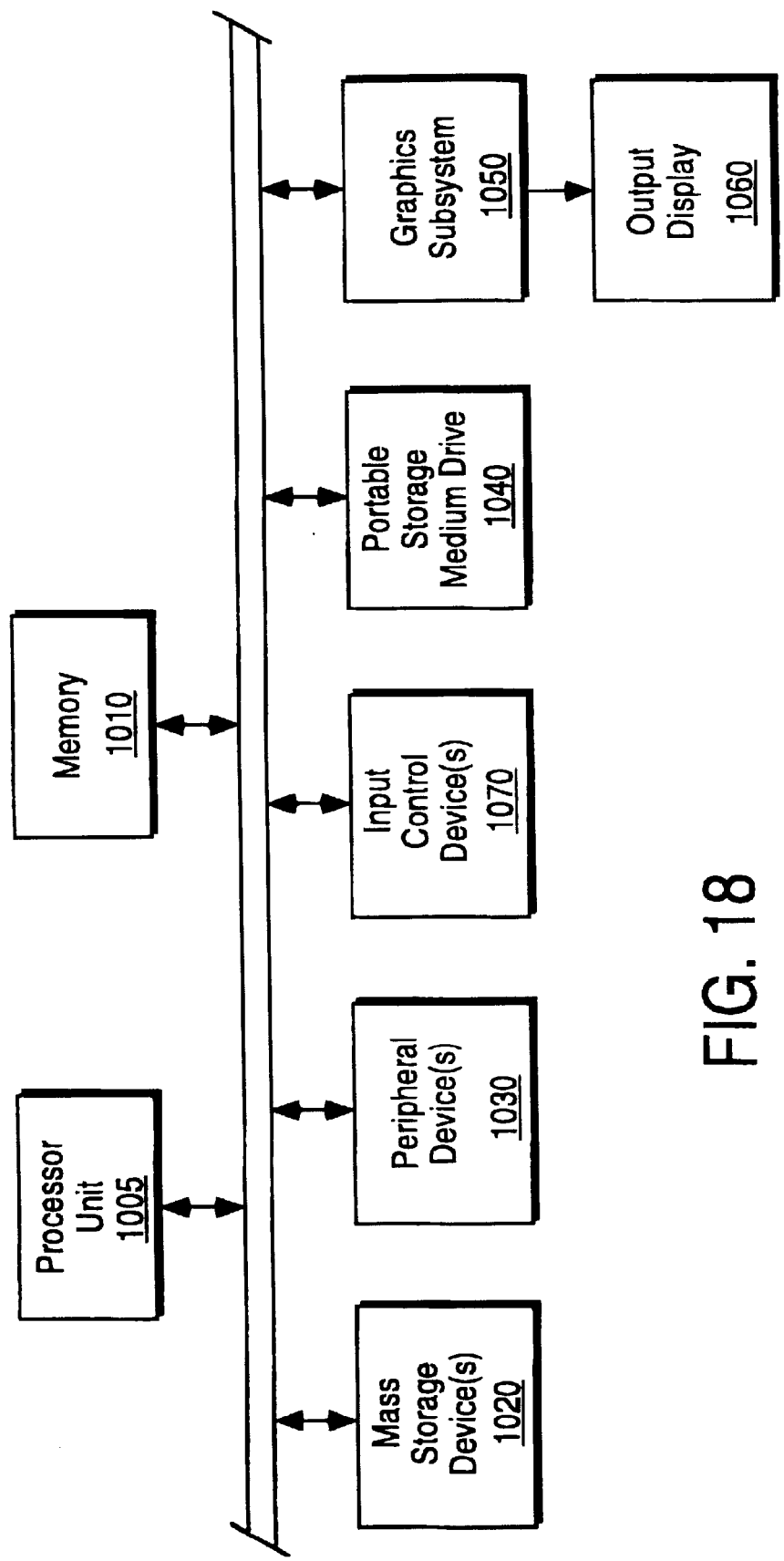
FIG. 18 illustrates a high level block diagram of a general purpose computer system in which the integrated object oriented system of the present invention may be implemented.

FIG. 17 is a flow diagram illustrating one embodiment for executing query operations utilizing adapters. To execute a query, the client locates an adapter that supports the data source as shown in block 710. As described above, to locate an adapter, the client obtains a connection to the appropriate adapter. Once there is an adapter connection, the client calls the "query sync" method with the query statement as shown in block 720 of FIG. 17. As shown in block 730, the client generates the single dialect query language statement. In one embodiment, the query sync method accepts a pointer to an object that supports the I_SQL select interface. The I_SQL select interface contains nodes that correspond to aspects of a SQL statement (e.g. the parse tree). Generally, the parse tree is a generic expression of the query. When the statement is in a parse tree form, the adapter interprets the parse tree. Specifically, in one embodiment, the adapter analyzes the parse tree to determine the attributes and types contained in the query. The adapter browses the meta data to identify the type specified in the parse tree as shown in block 740. Based on the type, the adapter identifies all the attributes and determines the mapping of the attribute to the data source through use of the corresponding storage type map. Based on the content of the parse tree, the adapter generates a where clause for the SQL statement. The generation of the data source query language statement from the parse tree is shown in block 750 of FIG. 17. The new query language statement for the data source is executed in the data source. In one embodiment, the adapter generates a command with a query language dialect to support the I_SQL select interface. The I_SQL select interface returns a collection based on the SQL statement.

An example query by a client to query an object stored in a relational database is described. The client obtains an adapter connection, and calls the "query sync" method with the parse tree to describe the query. The relational adapter, which supports the relational database, analyzes the parse tree, and browses the meta data to locate the class type described in the parse tree. Table 3 shows a class type for the target object stored in the relational database.

TABLE 3

| C_Dept. | |
|---|---|
| Name | String |
| Employee | Collection |

As shown in Table 3, the class type "C_Dept" includes the attribute "name" of the type string, and "employee", which is a collection of objects with a class type C_Emp. For this example, there is an association between each department and a collection of employees, wherein the collection of employees identifies the employees in the corresponding department. The relational adapter browses the meta data to determine that the query involves the C_Dept class type. The meta data fully describes the association between the C_Dept and C_Emp class types. The adapter determines, from the meta data, the association between the C_Dept class type and the C_Emp class type. Also, the adapter views the corresponding storage type map for the class type C_Dept. Table 4 illustrates an example storage type map, entitled T_Dept, for the class type C_Dept.

TABLE 4

| T_Dept. | |
|---|---|
| Number | PK_ID |
| Varchar | String |
| Number | PK_Dept. |

As shown in Table 4, the storage type map includes a primary key identification (PK_ID) for the relational table corresponding to the C_Dept class type. As identified by the storage type map, the name attribute in the class type C_Dept maps to a column C_Name in the relational table. Also, because class type C_Dept contains a collection of employees, the storage type map identifies a primary key column, PK_Dept. Thus, if the query specifies a collection of employees for the C_Dept class type, the adapter has the primary key to extract the collection. From the original parse tree, the adapter constructs the statement select (name, PK_Dept from T_Dept).

Table 5 shows a relational table for the C_Dept class type example.

TABLE 5

| DEPARTMENT |
|---|
| 1. Accounting |
| 2. Research & Development |
| 3. Marketing |
| . |
| . |
| . |

The relational table includes names of departments, such as Accounting, Research & Development, and Marketing. For the example, the adapter dispatches the newly constructed SQL statement to the relational data source, and the relational data source returns rows in accordance with the query. The query sync method of the I_Adapter connection interface returns a collection in response to the initial query to the client.

For another object mediator implementation, the client application uses the I_Object interface to query the object. The I_Object interface presents C_Dept only as an object. In this case, the I_Object interface presents C_Dept in a "Get Attribute Name" call, and the adapter returns the name of the attribute.

In one embodiment, the adapter stores whether the adapter has access to a collection, such as a collection of employee objects, or whether the collection is available through another adapter. For example, if the adapter does not maintain the collection, then the adapter creates a select statement for execution by the appropriate adapter. Adapters also use object reference tables. For example, if a table references an attribute outside the database, such as a collection of foreign objects, then the adapter utilizes an object reference table to reference the object. The storage type map contains an address that points to an object in the object reference table.

Computer System:

FIG. 19 illustrates a high level block diagram of a general purpose computer system in which the integrated object oriented system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the integrated object oriented system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 9 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the uniform object model software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the integrated object oriented system software is stored on such a portable medium, and it is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. The foreign objects and data from data sources may be input to the computer system 1000 via a portable storage medium or a network for processing by the integrated object oriented system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and it processes the information for output to the output display 1060. The components contained in the computer system 1000 are those typically found in general purpose computer systems, and in fact, these components are intended to represent a broad category of such computer components that are well known in the art.

In the preferred embodiment, the integrated object oriented system is software that includes a plurality of computer executable instructions for implementation on a general purpose computer system. Prior to loading into a general purpose computer system, the integrated object oriented system software may reside as encoded information on a computer readable medium, such as a magnetic floppy disk, magnetic tape, and compact disc read only memory (CD-ROM). The integrated object oriented system may be implemented in hardware. For this embodiment, circuits may be developed to perform the functions described herein.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for integrating objects defined by different type systems into a single integrated object oriented system, said method comprising the steps of:

providing an integrated object oriented system comprising, an integrated type system that supports a superset of features from a plurality of foreign object systems, said foreign object systems comprising a plurality of foreign objects defined by foreign type systems that are different from said integrated type system, said foreign objects including at least one method;

receiving into said integrated object oriented system a plurality of said foreign objects from said different foreign object systems;

converting said foreign objects into uniform object model objects defined by said integrated type system; and executing said foreign objects as uniform object model objects in a run time environment without loss of features provided by said foreign objects.

2. The method as set forth in claim 1, further comprising the step of layering onto said uniform object model objects, converted from said foreign object systems, an additional member, supported by said integrated type system, but not supported by said foreign object systems.

3. The method as set forth in claim 1, further comprising the step of exposing said uniform object model objects including the steps of:

receiving a request in said integrated object oriented system for a foreign object; and presenting, in response to said request, a uniform object model object, so as to provide a uniform view of all objects accessible in said integrated object oriented system.

4. The method as set forth in claim 1, wherein the step of converting said foreign objects into uniform object model objects comprises the step of generating instance level meta data and type system level meta data to define, in accordance with said superset type system, all objects in said integrated object oriented system.

5. The method as set forth in claim 1, further comprising the step of converting uniform object model objects to objects defined by said foreign object type system.

6. The method as set forth in claim 1, further comprising the step of registering foreign objects with said single integrated object oriented system for dynamic run time operation of said foreign objects.

7. The method as set forth in claim 1, further comprising the step of querying said objects based on a neutral query language that permits, from a user prospective, uniform querying of objects in said integrated object oriented system.

8. The method as set forth in claim 1, further comprising the steps of:

receiving data from at least one external data source; and converting said data received into objects defined by said type system.

9. The method as set forth in claim 1, further comprising the step of storing said uniform object model objects in at least one data source to provide persistence for all of said uniform object model objects.

10. A method for integrating at least one foreign object into an object oriented environment, said method comprising the steps of:

receiving into an object oriented environment at least one foreign object defined by a foreign object type system;

providing, for said object oriented environment, a type system that supports at least one additional feature not supported by said foreign object type system;

converting said at least one foreign object defined by said foreign object type system into an object with a class type compatible with said type system; and executing a plurality of objects, including said at least one foreign object, in a run time environment including implementing, via said object oriented environment, said additional feature for said at least one foreign object, such that said at least one foreign object operates as a full fledged object with functionality supported by said type system in said object oriented environment.

11. The method as set forth in claim 10, wherein the step of executing a plurality of objects, including said at least one foreign object comprises the steps of:

provicing a surrogate object for said foreign object; and receiving direct calls from clients of said object oriented environment to said foreign object being implemented to operate as a surrogate object for said foreign object.

12. The method as set forth in claim 10, wherein the step of implementing said additional feature comprises the step of enforcing a rule, declared through said type system, against said foreign object being implemented.

13. The method as set forth in claim 10, wherein the step of implementing said additional feature supported by said type system of said object oriented environment comprises the step of triggering an event in said foreign object being implemented upon occurrence of a predetermined condition.

14. The method as set forth in claim 10, wherein the step of implementing said additional feature supported by said type system of said object oriented environment comprises the step of checking, in response to an event, associations among one or more objects, including said foreign object being implemented.

15. The method as set forth in claim 10, wherein the step of converting said at least one foreign object comprises the step of generating meta data to describe a class type compatible with said object oriented environment to permit browsing of class types converted.

16. The method as set forth in claim 10, wherein the step of converting said at least one foreign object comprises the step of generating objects in accordance with a type system that supports a superset of features from foreign object type systems.

17. The method as set forth in claim 10, further comprising the step of generating an instance of said class type converted from said foreign object for use in said object oriented environment.

18. The method as set forth in claim 10, further comprising the step of converting a class type registered in said object oriented environment to a class type defined in accordance with said foreign type system.

19. The method as set forth in claim 10 further comprising the steps of:

mapping components of a data source into at least one class type defined in accordance with a type system for said object oriented environment;

receiving a client request for data stored in said data source; and generating, in response to said request, an object, defined in accordance with a class type specified by said client, populated with said data, in accordance with said mapping to said class type, so as to provide an object access mechanism from said data source to said object oriented environment.

20. The method as set forth in claim 19, wherein the step of generating an object comprises the steps of:

storing meta data to describe each class type registered with said object oriented environment;

browsing said meta data to determine said class type specified by said client;

creating an instance of said class type; and populating with data from said data source said instance of said class type in accordance with said mapping of said components of said data source into said class type.

21. The method as set forth in claim 19, wherein the step of mapping components of a data source comprises the step of mapping columns of a relational table in a relational data source to members of a class type of said object oriented environment.

22. The method as set forth in claim 19, further comprising the steps of:

receiving, from a client of said object oriented environment, a query statement for a target data source expressed in a single predetermined dialect of a query language;

parsing said query statement to extract information about said query; and generating a second query statement compatible with said target data source, wherein a client is not required to maintain multiple query dialects to execute query statements against data sources that support different query language dialects.

23. A method for implementing persistence of objects in an object oriented environment, said method comprising the steps of:

receiving a request from a client of said object oriented environment to store an object in a data source;

generating, in response to said request to store said object, a token that identifies said object;

transmitting said token to said client;

assigning an adapter to interface between said data source and said object oriented environment, said adapter interfacing said data source to said object oriented environment; and associating said token with said adapter, wherein said token identifies said object in said logical repository without requiring said client to directly communicate with said adapter that supports said data source.

24. The method as set forth in claim 23, further comprising the steps of:

receiving a request from a client to retrieve said object in said data source, said request including said token;

executing an operation through said adapter to retrieve said object from said data source;

generating, in response to said request, a connection from said client to said data source, wherein said client is not required to maintain details specific to said data source.

* * * * *